US00RE48139E

(19) United States
(12) Reissued Patent
Heeg

(10) Patent Number: US RE48,139 E
(45) Date of Reissued Patent: Aug. 4, 2020

(54) ULTRASONIC WELDING DEVICE AND ULTRASONIC WELDING METHOD FOR CONTROLLING CONTINUOUS ULTRASONIC WELDING PROCESSES

(71) Applicant: BRANSON ULTRASCHALL Niederlassung der Emerson Technologies GmbH & Co. OHG, Dietzenbach (DE)

(72) Inventor: Christian Heeg, Mömbris (DE)

(73) Assignee: BRANSON ULTRASCHALL Niederlassung der Emerson Technologies GmbH & Co. OHG, Dietzenbach (DE)

(21) Appl. No.: 15/660,157

(22) Filed: Jul. 26, 2017

Related U.S. Patent Documents

Reissue of:
(64) Patent No.: 9,283,713
Issued: Mar. 15, 2016
Appl. No.: 14/561,666
Filed: Dec. 5, 2014

(30) Foreign Application Priority Data

Dec. 5, 2013 (DE) ..... 10 2013 225 042

(51) Int. Cl.
*B32B 37/00* (2006.01)
*B29C 65/00* (2006.01)
(Continued)

(52) U.S. Cl.
CPC ..... *B29C 66/9516* (2013.01); *B06B 1/0246* (2013.01); *B23K 20/103* (2013.01);
(Continued)

(58) Field of Classification Search
CPC ..... B29C 65/08; B29C 65/085; B29C 65/086; B29C 66/92921; B29C 66/83511;
(Continued)

(56) References Cited

U.S. PATENT DOCUMENTS 4,313,778 A 2/1982 Mims
5,637,947 A 6/1997 Kising et al.
(Continued)

FOREIGN PATENT DOCUMENTS

DE 3130128 A1 4/1982
DE 4230491 A1 3/1993
(Continued)

OTHER PUBLICATIONS

JP Office Action for JP Application No. 2014-246734 dated Jan. 26, 2016 (10 pages).
(Continued)

*Primary Examiner* — Elizabeth L McKane
(74) *Attorney, Agent, or Firm* — Reising Ethington P.C.

(57) ABSTRACT

An ultrasonic processing method and an ultrasonic processing device may include a controlling/regulating module, preferably a digital controlling/regulating module, which is integrated into a signal processing of the ultrasonic generator so that a plurality of generator data with respect to the ultrasonic generator are processible in the ultrasonic generator. At this, a power actual value $P_{ist}$ is compared with a power reference value $P_{soll}$ of the ultrasonic generator via a gap regulator in the controlling/regulating module to specify a position reference value $POS_{soll}$ of the sonotrode relative to the roll for adjustment of the power reference value $P_{soll}$ of the ultrasonic generator, and/or a power actual value $P_{ist}$ is compared with a power reference value $P_{soll}$ of the ultrasonic generator via an amplitude regulator in the controlling/regulating module to specify an amplitude reference value $A_{soll}$ to the ultrasonic generator for adjustment of the power reference value $P_{soll}$.

19 Claims, 8 Drawing Sheets

(51) Int. Cl.

| | |
|---|---|
| ***B23K 20/10*** | (2006.01) |
| ***B29C 65/08*** | (2006.01) |
| ***B06B 1/02*** | (2006.01) |
| *B29L 9/00* | (2006.01) |

(52) U.S. Cl.

CPC ..... *B29C 65/08* (2013.01); *B29C 65/085* (2013.01); *B29C 65/086* (2013.01); *B29C 66/1122* (2013.01); *B29C 66/232* (2013.01); *B29C 66/43* (2013.01); *B29C 66/45* (2013.01); *B29C 66/8242* (2013.01); *B29C 66/83411* (2013.01); *B29C 66/83511* (2013.01); *B29C 66/9241* (2013.01); *B29C 66/92611* (2013.01); *B29C 66/92613* (2013.01); *B29C 66/92921* (2013.01); *B29C 66/932* (2013.01); *B29C 66/942* (2013.01); *B29C 66/9592* (2013.01); *B29C 66/961* (2013.01); *B29C 66/9231* (2013.01); *B29C 66/9321* (2013.01); *B29L 2009/00* (2013.01)

(58) Field of Classification Search

CPC ..... B29C 66/9241; B29C 66/92611; B29C 66/8242; B29C 66/232; B29C 66/9516; B29C 66/942; B29C 66/1122; B29C 66/961; B29C 66/9592; B29C 66/43; B29C 66/9231; B29C 66/9321; B29C 66/932; B29C 66/92613; B29C 66/45; B29C 66/83411; B23K 20/103; B06B 1/0246; B29L 2009/00

See application file for complete search history.

(56) References Cited

U.S. PATENT DOCUMENTS

| | | | | |
|---|---|---|---|---|
| 5,658,408 | A * | 8/1997 | Frantz et al. | 156/64 |
| 5,772,814 | A * | 6/1998 | Grewell | 156/64 |
| 5,788,791 | A * | 8/1998 | Grewell | 156/73.1 |
| 5,855,706 | A * | 1/1999 | Grewell | 156/64 |
| 6,036,796 | A | 3/2000 | Halbert et al. | |
| 6,190,296 | B1 | 2/2001 | Gnad et al. | |
| 6,336,803 | B1 | 1/2002 | Funger et al. | |
| 7,868,518 | B2 | 1/2011 | Gnad et al. | |
| 7,892,372 | B2 * | 2/2011 | Lee et al. | 156/64 |
| 9,283,713 | B2 | 3/2016 | Heeg | |
| 9,427,914 | B2 | 8/2016 | Heeg | |
| 2006/0149485 | A1 * | 7/2006 | Oblak | B06B 3/00 702/56 |
| 2007/0251977 | A1 | 11/2007 | Gnad et al. | |
| 2008/0314498 | A1 * | 12/2008 | Lee et al. | 156/64 |

FOREIGN PATENT DOCUMENTS

| | | | |
|---|---|---|---|
| DE | 4400210 | A1 | 8/1995 |
| DE | 19526354 | C1 | 1/1997 |
| DE | 19753740 | C1 | 7/1999 |
| DE | 10009174 | A1 * | 9/2001 |
| DE | 10063363 | C1 | 6/2002 |
| DE | 19861021 | B4 | 10/2004 |
| DE | 19581256 | B4 | 12/2007 |
| DE | 102006054760 | A1 | 5/2008 |
| DE | 1020006054760 | A1 | 5/2008 |
| DE | 102006020417 | B4 | 10/2008 |
| DE | 102011102746 | A1 | 5/2012 |
| EP | 0790888 | B1 | 6/1999 |
| EP | 0967021 | A2 | 12/1999 |
| GB | 2279034 | | 12/1994 |
| JP | S6283588 | | 5/1987 |
| JP | 2000015701 | A | 1/2000 |
| JP | 2002059483 | A | 2/2002 |
| JP | 2006231698 | | 9/2006 |
| JP | 2008526515 | | 7/2008 |
| JP | 2011143419 | | 7/2011 |
| JP | 6041852 | B2 | 12/2016 |
| KR | 20000005627 | | 1/2000 |
| WO | WO9614202 | A2 | 5/1996 |
| WO | WO2006074101 | A1 | 7/2006 |

OTHER PUBLICATIONS

EP Office Action for EP Application No. 14194234.2 dated Feb. 14, 2017 (4 pages).

JP Office Action for JP Application No. 2014-246734 dated Nov. 7, 2017 (7 pages).

EP Search Report for EP Application No. 14194234.2 dated Apr. 13, 2015 (3 pages).

KR Office Action for KR Application No. 10-2014-0174247 dated Jan. 6, 2016 (10 pages).

* cited by examiner

ULTRASONIC WELDING DEVICE AND ULTRASONIC WELDING METHOD FOR CONTROLLING CONTINUOUS ULTRASONIC WELDING PROCESSES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application claims the priority of German patent application DE 10 2013 225 042.8, filed on Dec. 5, 2013. The entire contents of this priority application is incorporated herein by reference.

TECHNICAL FIELD

The present disclosure relates to an ultrasonic welding device as well as an ultrasonic welding method by means of which continuous ultrasonic welding processes for ultrasonic welding of web material are controlled or regulated.

BACKGROUND

Devices for the continuous ultrasonic processing of a material web are sufficiently known. At these devices, the ultrasonic oscillating unit usually comprises a converter, often an electro-acoustic transducer, at which a sonotrode is arranged via an amplitude transformation part, also called booster. But, there exist also embodiments wherein the sonotrode is connected directly to the converter. At such ultrasonic oscillating units, either the oscillating module is beared in a converter housing or the amplitude transformation part is beared by a retaining ring or the sonotrode is beared in a seating. These bearings are arranged always at or at least near the oscillation nodes of the ultrasonic oscillation. The sonotrode of the oscillating unit is arranged opposite to a counter tool. At the ultrasonic welding of web material, the counter tool consists of a roll having an even or an uneven circumferential contour or welding contour. It is also known to provide a rotatable sonotrode, for example in the form of a roll. In different embodiments, this sonotrode roll comprises the converter. Further, the sonotrode roll is arranged rotatably with respect to a counter tool, for example an anvil. The rotatable sonotrode roll and the counter tool perform a relative movement with respect to each other so that a gap between both is adjustable. Further, the rotatable sonotrode roll has an even or an uneven circumferential contour or welding contour.

For operating an electro-acoustic transducer (converter having a piezo-ceramic) with its parallel or ultrasonic resonance frequency, which is usually a predetermined frequency in the range of 18 kHz and 60 kHz, a special electronic power supply, an ultrasonic generator, is required. The power supply of a piezo-electronic transducer which is provided with a sonotrode must be able to feed it with its resonance frequency. Such a combination of transducer and sonotrode is mainly used for welding of thermoplastic parts, at which a power of several hundred watts up to some kilowatts is required for time intervals ranging from several milliseconds up to a continuous load. These known ultrasonic generators control or regulate only the electro-acoustic transducer.

For adjustment of an ideal welding and/or cutting clearance height between the sonotrode and the counter tool, the ultrasonic oscillating unit is driven for example by means of a pneumatic drive against a mechanical stop and fixedly positioned in this manner with respect to the counter tool. Here, it is disadvantageous that the ultrasonic oscillating unit cannot react to variations in the thickness of the material to be welded. This fixed bearing of the sonotrode is for example described in DE 195 81 256 B4.

There are also known devices wherein the ultrasonic oscillating unit is blocked via an electromotive drive (for example step motor or servomotor).

In DE 195 26 354 C1, a sensor detects the distance between the sonotrode and the counter tool. A respective signal of the sensor is then transmitted to an external controlling and regulating device. Depending on this sensor signal, a change of the distance between the sonotrode and the counter tool is controlled. In DE 10 2006 054 760 A1, a drive moves the sonotrode in the direction of the counter tool or the counter tool is moved in the direction of the sonotrode. A sensor detects the state data of the drive at its input or its output. Depending on these state data detected by the sensor, the distance between sonotrode and counter tool is changed. In DE 197 53 740 C1, a force sensor detects the pressure force of the sonotrode in the direction of the counter tool. Depending on this detected pressure force, a signal is produced by the sensor and transmitted to an external controlling or regulating device. This controlling or regulating device outputs then a respective control signal based on which the distance between sonotrode and counter tool is adjusted.

In case the material web is now guided through the welding or cutting clearance or gap, than a reaction force acts on the sonotrode generated by the material web as well as the welding force. Especially at high and/or varying welding forces, at high web speeds, at changing thicknesses of the web and at specific contours of the rolls, this reaction force leads thereto that the sonotrode gives way to the material web, i.e. the sonotrode is moved away from the counter tool. The reaction force of the web material is especially high if the roll comprises so-called transverse seams or transverse seam-like contours, i.e. an uneven circumferential contour. These are usually contours extending transversely to the rotation direction of the roll, i.e. the welding does not occur two dimensional but only on these contours (elevations). This is usually used to cut the produced single products out of the material web in a subsequent process step. In practice, it has been shown that such contours are difficult to be weld with consistent quality. As the reaction force of the web material is stronger than the blocking force, a yielding or giving way movement occurs due to bearing and clearance in the driving components of the ultrasonic oscillating unit and the gap is opened to such an extent that the following seam does not have a suitable strength. Accordingly, especially at the following seam, the welding result is not satisfying.

DE 44 00 210 A1 describes a method for physically correctly controlling the frequency and power output of a digital generator, especially for an ultrasonic welding process, as well as a reduction of the effort at the dimensionally correct manufacturing of ultrasonic transducers, amplitude transformers and sonotrodes. The method, which is performed by means of a digital control unit, compensates not only the spread of the resonance frequency in a wide range but it is also able to level displacements of the resonance point during the welding process due to temperature or pressure changes. Power fluctuations caused by fluctuations of the supply voltage or the pressure are detected and compensated by the software. The software registers the total process of inline-machines, adapts its parameters and monitors the total cycle. The sequence of the individual processes like parameter detection of the transducers system in idle state, detection of the parameters under pressure, supplying energy as gently as possible for the acoustical and electronic components, identification of trends of important system parameters and exceeding of predetermined threshold values are dealt with by the software. The software automatically detects the physically correct control and regulating parameters and therefore ensures an optimal efficiency factor during the transformation of electrical energy in ultrasonic energy.

DE 100 09 174 A1 describes an ultrasonic processing device which is operated via an external controlling and regulating device. The external controlling and regulating device receives a signal from the ultrasonic generator which characterizes the output signal of the generator. For regulating the output power of the generator, the pressing force or the amplitude of the sonotrode is adapted via the controlling and regulating device. Due to the variation of the amplitude of the sonotrode, changes of the output power of the generator are readily detectable and reaction times of the ultrasonic oscillating unit in the range of 5 to 10 ms result. If the pressing force of the sonotrode is varied via the control of a valve, reaction times in the range of 50 to 700 ms are achieved.

It is an object of at least some embodiments of the present innovations to improve the operation of known ultrasonic processing devices to the effect that it can react quickly and flexibly to a change of the operating conditions of the ultrasonic processing device so that the processing result of the ultrasonic processing device is guaranteed.

SUMMARY

The above and other objects may be solved by an ultrasonic processing device according to the independent claims 1 and 3 as well as by an ultrasonic processing method according to the independent claim 13. Preferred embodiments of the present invention as well as developments result from the following description, the accompanying drawings and the appending claims.

The ultrasonic processing device according to at least some implementations of the invention comprises the following features: an ultrasonic generator, a converter and at least one sonotrode with an oppositely arranged counter tool, which are spaced from each other by a gap, wherein the sonotrode or the counter tool is arranged rotatably and comprises an even circumferential surface, a controlling/regulating module, preferably a digital controlling/regulating module, which is integrated into a signal processing of the ultrasonic generator so that a plurality of generator data with respect to the ultrasonic generator are processible in the ultrasonic generator, especially an electric voltage $U_{us}$, an electric current I, an actual amplitude $A_{ist}$ and/or an actual generator power $P_{ist}$, wherein a) a power actual value $P_{ist}$ is comparable with a power reference value $P_{soll}$ of the ultrasonic generator by means of a gap controller in the controlling/regulating module to specify and adjust a position reference value $POS_{soll}$ of the sonotrode relative to the roll for adjustment of the power reference value $P_{soll}$ of the ultrasonic generator, and/or wherein b) a power actual value $P_{ist}$ is comparable with a power reference value $P_{soll}$ of the ultrasonic generator by means of an amplitude controller in the controlling/regulating module to specify an amplitude reference value $A_{soll}$ to the ultrasonic generator for adjustment of the power reference value $P_{soll}$.

The ultrasonic processing device according to at least some implementations of the invention is used for welding, cutting and/or sewing of materials by means of ultrasonics. By doing so, continuous web material is moved through the gap between the counter tool and the sonotrode of the ultrasonic processing device. The sonotrode and the counter tool are adjustable in their distance to each other by means of a relative movement so that a gap is present between sonotrode and counter tool having a defined width. According to a preferred embodiment of the present invention, the sonotrode is arranged opposite to a rotatably mounted roll as counter tool. A further preferred embodiment provides the sonotrode for example in the shape of a sonotrode roll being arranged rotatably. To this end, preferably at least one sonotrode is installed in a rotatably arranged roll so that the radial outer surface of the roll transfers with its circumferential contour the ultrasonic oscillations of the sonotrode/s to the web material. In an embodiment, the counter tool is formed by an anvil. To be able to adjust the gap between rotatable sonotrode and anvil in its width, preferably the anvil and/or the rotatable sonotrode are movable to ensure the above-mentioned relative movement between both of them.

The ultrasonic processing device is used especially preferred as ultrasonic welding device. In contrast to the above discussed ultrasonic processing devices according to the prior art, the controlling and regulating of the complete processing procedure is performed in the ultrasonic generator. To this end, the signal processing of the ultrasonic generator comprises a controlling/regulating module by means of which the conditions or requirements of the processing processes are determined. Thereto belongs preferably a signal generation for the positioning of external actuator systems as for example the gap or the distance, respectively, between the sonotrode and the roll. As the controlling/regulating module is integrated in the signal processing of the ultrasonic generator, here also the generator data, which are necessary for the operation of the ultrasonic generator, or a selection thereof is available. This plurality of generator data includes for example the electric voltage $U_{us}$, the electric current I, the actual amplitude $A_{ist}$ and the actual generator power $P_{ist}$. If necessary, the controlling/regulating module uses at least a selection of the plurality of generator data without that time is required for the transformation and/or adaption and/or transmission of the generator data between the ultrasonic generator and the controlling/regulating module. Besides the time savings within the data processing process for the ultrasonic processing process resulting therefrom, by means of this combination of ultrasonic generator and integrated controlling/regulating module also a verification and more detailed calculation of processing data for the ultrasonic processing process is ensured. Further, the here used integration of the controlling/regulating module into the signal processing of the ultrasonic generator causes that complex, partly interference-prone and further partly space-consuming external controllers can be avoided, for example for regulating the gap between sonotrode and roll or anvil, respectively.

The ultrasonic processing device regulates the ultrasonic processing process depending on a power of the ultrasonic generator. The desired power reference value $P_{soll}$ of the ultrasonic generator is adjusted by means of the gap regulator and/or the amplitude regulator in the controlling/regulating module. In case, for example, a predetermined power reference value $P_{soll}$ of the ultrasonic generator shall be achieved, the gap regulator controls a respective position reference value $POS_{soll}$ of the sonotrode with respect to the counter tool, i.e. to the roll or the anvil, respectively. In combination therewith or as an alternative to the gap regulator, it is also preferred to use an amplitude regulator in the ultrasonic processing device. At a defined adjusted gap between sonotrode and counter tool, preferably roll or anvil, respectively, the amplitude controller specifically changes the amplitude of the ultrasonic oscillation created by the ultrasonic generator and impressed into the sonotrode. Correspondingly, the controlling of a larger amplitude by the amplitude controller in the controlling/regulating module causes a decrease of the gap between the sonotrode and the counter tool, preferably the roll or the anvil, respectively, whereby the power actual value $P_{ist}$ of the ultrasonic generator is increased. In the same way, the controlling of a smaller amplitude of the ultrasonic oscillation created by the ultrasonic generator causes an increase of the gap between sonotrode and roll or anvil, respectively, or counter tool. Thus, power reference values $P_{soll}$ of the ultrasonic generator are specifically controllable or regulatable by means of the gap regulator and the amplitude regulator alone or in combination.

According to a preferred embodiment of the present invention, the ultrasonic processing device comprises an external sensor by means of which an angular speed of the rotatably arranged sonotrode or the rotatably arranged counter tool is detectable. This detected angular speed is transmitted to the gap regulator and/or the amplitude regulator in the ultrasonic generator. At the processing of web material, the gap width between sonotrode and counter tool, preferably a rotating roll, is adjusted depending on the speed of the web material moving through the gap. The angular speed of the counter tool or the roll detected by the sensor represents the speed of the web material. If the angular speed detected by the sensor is transmitted to the amplitude regulator and/or the gap regulator, preferably both regulators revert to learned characteristic curves and/or characteristic value charts providing a power reference value $P_{soll}$ of the ultrasonic generator depending on the speed of the web material through the gap between sonotrode and counter tool. As soon as this power reference value $P_{soll}$ of the ultrasonic generator is compared with its actual power value $P_{ist}$, a preferably provided regulator specifies an amplitude reference value for the amplitude of the ultrasonic oscillation of the ultrasonic generator, which is adapted to the comparison. In the same way, the gap regulator specifies a position reference value for the sonotrode or the counter tool with respect to the oppositely arranged roll for adjusting the gap in its width. Within the ultrasonic generator, the predetermined amplitude reference value is compared with the presently existing amplitude actual value and is then adjusted correspondingly. Preferably, a position sensor detects the position of the sonotrode with respect to the counter tool, preferably the rotating roll or the anvil, so that a servomotor can relocate the sonotrode respectively for adjustment of the position reference value.

At least some embodiments of the present invention may also include an ultrasonic processing device having the following features: an ultrasonic generator, a converter and at least one sonotrode with an oppositely arranged counter tool, preferably a rotatable roll, which are spaced from each other by a gap, wherein the sonotrode or the counter tool is arranged rotatably and comprises an uneven circumferential surface, a controlling/regulating module, preferably a digital controlling/regulating module, which is integrated in a signal processing of the ultrasonic generator so that with respect to the ultrasonic generator a plurality of generator data is processible in the ultrasonic generator, especially an electric voltage $U_{us}$, an electric current I, an actual amplitude $A_{ist}$ and/or an actual generator power $P_{ist}$, wherein a) a power actual value $P_{ist}$ is comparable with a power reference value $P_{soll}$ of the ultrasonic generator by means of a gap regulator in the controlling/regulating module to specify a position reference value $POS_{soll}$ of the sonotrode with respect to the counter tool for adjustment of the power reference value $P_{soll}$ of the ultrasonic generator, and/or wherein b) a power actual value $P_{ist}$ is comparable with a power reference value $P_{soll}$ of the ultrasonic generator by means of an amplitude regulator to specify an amplitude reference value $A_{soll}$ to the ultrasonic generator for adjustment of the power reference value $P_{soll}$ of the ultrasonic generator.

In contrast to the above described ultrasonic processing device, here a rotatable sonotrode, preferably in a sonotrode roll, is arranged oppositely to a counter tool, like an anvil, or a rotatable roll is arranged oppositely to a preferably linearly adjustable sonotrode. According to at least some implementations of the invention, the sonotrode roll or the rotatable roll have an uneven circumferential surface which form each the welding contour during ultrasonic welding. The uneven welding contour of the roll or the rotatable sonotrode roll, which is for example created by transverse seams, leads to a varying surface configuration of the circumferential contour. As follows therefrom, the welding power applied by the sonotrode and the ultrasonic generator varies within one rotation of the roll or the sonotrode. As the uneven roll or sonotrode rotates, the uneven surface configuration of the roll or the sonotrode creates timely periodically repeating patterns in the condition data of the ultrasonic generator. These patterns are evaluable to detected and more precisely evaluate, to develop and to perform more precisely with respect to the prior art the operation of the ultrasonic processing device.

According to a preferred embodiment of the present invention, the uneven circumferential surface of the roll or the sonotrode comprises at least one detectable contour creating in at least one data set of the plurality of generator data (see above) plotted against a time signal at least one timely periodically repeating pattern, preferably a peak, due to a rotation of the roll or the sonotrode. Due to this constructive basis, an angular speed of the counter tool, preferably a roll, or the rotatable sonotrode is determinable without an external sensor at the roll based on a system time of the controlling/regulating module in the controlling/regulating module. In case preferably and exemplary the power of the ultrasonic generator is detected over one complete revolution of the roll or the rotatable sonotrode, each transverse seam or uneven contour of the uneven roll or rotatable sonotrode leads to an increase of the power outputted by the ultrasonic generator. When thus the power of the ultrasonic generator is plotted against a system time of the controlling/regulating module or against another system time, timely periodically repeating peak values in the power of the ultrasonic generator result. From the timely distances of these peak values in the power of the ultrasonic generator, the angular speed of the rotating roll or the rotating sonotrode and thus also the speed of the web material moving through the gap is determinable. While a time efficient data evaluation takes place in the controlling/regulating module, an external sensor for detecting the angular speed of the roll can be avoided at the same time. In the same way, preferably another quantity of the above-mentioned and detected generator data is chosen, detected and evaluated.

According to another preferred embodiment of the present invention, the counter tool is a rotatably arranged roll. The sonotrode is arranged adjustable with respect to the roll so that a reference position $POS_{soll}$ of the sonotrode with defined gap relative to the roll is detectable via a position sensor and is adjustable by means of an actuator.

According to another preferred embodiment of the ultrasonic processing device according to the invention, a digital ultrasonic generator is used in combination with a digital operating controlling/regulating module. In this context, it is also preferred to provide the amplitude regulator digitally. Due to this constructive basis, the power actual value $P_{ist}$ of the ultrasonic generator is adjustable by means of the amplitude regulator within the controlling/regulating module. According to another preferred embodiment of the ultrasonic processing device, the amplitude regulator is provided without gap regulator so that at adjusted gap width between roll and sonotrode or between rotatable sonotrode and counter tool a distance between the sonotrode and the roll or the counter tool can be regulated by means of the adjustment of the amplitude reference value. To this end, preferably the sonotrode can be arranged fixedly during the operation of the ultrasonic processing device so that a motoric positioning of the sonotrode by means of a position sensor is not necessary. In the same way, it is also preferred to use the gap regulator and the amplitude regulator in combination. Based thereon, the power reference value $P_{soll}$ of the ultrasonic generator can be regulated by means of an active gap adjustment in combination with an amplitude adjustment of the sonotrode.

According to another preferred embodiment of the ultrasonic processing device having an uneven circumferential surface of the roll it has already been described above that based on the timely periodically repeating patterns, preferably peaks, the angular speed of the roll can be determined in at least one data set of the plurality of generator data without an external sensor. In this context it has also been detected that the repeating patterns, preferably peaks, in at least one data set of the plurality of generator data represents processing times of the ultrasonic processing device. Therefore, the controlling/regulating module is preferably used to detect these processing times in the timely range of the repeating patterns/peaks. As only in the timely range of the repeating patterns or peaks, respectively, a processing by the ultrasonic processing device occurs, preferably the evaluation procedures as well as controlling and regulating procedures for the power actual value $P_{ist}$ of the ultrasonic generator and/or the amplitude actual value $A_{ist}$ and/or the position reference value $POS_{soll}$ are only performed during these processing times. Therefore, preferably only the data in the periodically occurring processing times are detected and processed. According to an embodiment, the data or measurement values are averaged. By proceeding this way, for example detectable data outside of the processing times, and thus non-relevant data which is also called noise, is mainly excluded from the data detection and processing. In this way, the precision of the data detection and processing is increased and the processing power required for the controlling and regulating procedures of the controlling/regulating module is further reduced. Therefore, redundant or no longer required computing capacity of the controlling/regulating module is available for other tasks.

For realizing an efficient construction of the ultrasonic processing device, it is preferred to provide the amplitude regulator without gap regulator so that at adjusted gap width between the counter tool, preferably a roll, and the sonotrode a distance between the sonotrode and the roll can be regulated via the adjustment of the amplitude reference value. It is also preferred that the adjustable sonotrode or the adjustable counter tool is fixedly arrangeable during the operation of the ultrasonic processing device so that a motoric positioning of the sonotrode or the counter tool via a position sensor is not necessary. According to another preferred embodiment of the present invention, the gap regulator and the amplitude regulator are usable in combination so that the power reference value of the ultrasonic generator can be regulated by means of an active gap adjustment in combination with an amplitude adjustment of the sonotrode.

Due to the above described efficient construction of the ultrasonic processing device, preferably the gap regulator achieves a reaction time of the ultrasonic processing device due to controlling/regulating interventions of the controlling/regulating module in a range <50 ms, preferably <30 ms. Due to the above efficient construction of the ultrasonic processing device, the amplitude regulator preferably also achieves a reaction time of the ultrasonic processing device on controlling/regulating interventions of the controlling/regulating module in the range of <50 ms, preferably <40 ms and especially <20 ms. The reaction times of the ultrasonic processing device realizable in at least some implementations of the present invention make clear that the integration of the controlling/regulating module into the signal processing of the ultrasonic generator is more effective than known controllers arranged externally from the ultrasonic generator for example for regulating a gap between sonotrode and roll.

At least some implementations of the present inventions may further comprise an ultrasonic processing method of an ultrasonic processing device comprising an ultrasonic generator, a converter and at least one sonotrode with an oppositely arranged counter tool, which are spaced from each other by a gap, wherein the sonotrode or the counter tool is arranged rotatably and comprises an even or an uneven circumferential surface, a controlling/regulating module, preferably a digital controlling/regulating module, integrated in a signal processing of the ultrasonic generator so that with respect to the ultrasonic generator a plurality of generator data is processible in the ultrasonic generator, especially an electric voltage $U_{us}$, an electric current I, an actual amplitude $A_{ist}$ and/or an actual generator power $P_{ist}$, wherein the ultrasonic processing method comprises the following steps: a) determining an angular speed of the rotatably arranged counter tool or the rotatably arranged sonotrode, b) detecting at least one data set of the plurality of generator data, c) comparing a power actual value $P_{ist}$ with a power reference value $P_{soll}$ of the ultrasonic generator in a gap regulator and specifying a position reference value $POS_{soll}$ of the sonotrode with respect to the counter tool and/or d) comparing a power actual value $P_{ist}$ with a power reference value $P_{soll}$ of the ultrasonic generator and specifying an amplitude reference value in the ultrasonic generator for adjusting the power reference value $P_{soll}$ of the ultrasonic generator.

The above described preferred steps of the ultrasonic processing method refer to the usage of the also above described gap regulator and/or amplitude regulator for adjusting the actual power of the ultrasonic generator to a predetermined reference value. In this context, it is preferred to detect the angular speed of the roll arranged oppositely to the sonotrode or the rotating sonotrode arranged oppositely to an anvil with an external sensor at the roll and to transmit the detected angular speed to the gap regulator and/or the amplitude regulator. Alternatively, it is preferred at a roll or a rotatable sonotrode having an uneven circumferential surface with at least one detectable contour to detect at least one data set of the plurality of generator data over a plurality of revolutions of the roll, to evaluate timely periodically occurring patterns, especially peaks, in at least one data set of the plurality of generator data plotted against the time based on a system time of the controlling/regulating module so that an angular speed of the roll is determinable without external sensor, and to transmit the determined angular speed to the gap regulator and/or the amplitude regulator.

According to another embodiment of the preferred ultrasonic processing method, processing times of the ultrasonic processing device are determined in the timely range of the periodically occurring patterns or peaks and the performing of the evaluating and/or controlling and/or regulating procedures for the power actual value $P_{ist}$ of the ultrasonic generator and/or the amplitude actual value $A_{ist}$ and/or the position reference value $POS_{soll}$ are restricted to the above determined processing times or processing time ranges of the ultrasonic processing device.

According to a further preferred embodiment of the ultrasonic processing method, a reference position $POS_{soll}$ of the sonotrode with defined gap relative to the roll is adjusted via a position sensor and an actuator. It is further preferred to adjust a fixed gap between the sonotrode and the roll, wherein no position sensor with actuator is necessary. In the following, the power reference value $P_{soll}$ of the ultrasonic generator is adjusted via adjusting the amplitude reference value $A_{soll}$ of the sonotrode. In this context, it is also preferred to adjust the power reference value $P_{soll}$ of the ultrasonic generator by means of the gap regulator and the amplitude regulator in combination, wherein the power reference value $P_{soll}$ of the ultrasonic generator is regulatable by means of an active gap adjustment in combination with an amplitude adjustment of the sonotrode.

According to a further preferred embodiment of the ultrasonic processing method, an overriding or lock-on of a pre-controlling function on the amplitude regulator and/or on the position regulator is realized so that a predictive amplitude regulating occurs.

A further preferred embodiment of the ultrasonic processing method may include the further steps: determining of processing times of the ultrasonic processing device based on the timely periodically occurring patterns or peaks in at least one data set of the plurality of generator data and overriding a pre-controlling function onto at least one correcting variable at the determined processing times so that systemic timely displacements or disturbing influences at the processing of the material web may be considered predictively.

BRIEF DESCRIPTION OF THE DRAWINGS

The preferred embodiments of the present invention will now be described with respect to the accompanying drawings in detail. It shows.

DETAILED DESCRIPTION OF PREFERRED EMBODIMENTS

Figure 1:
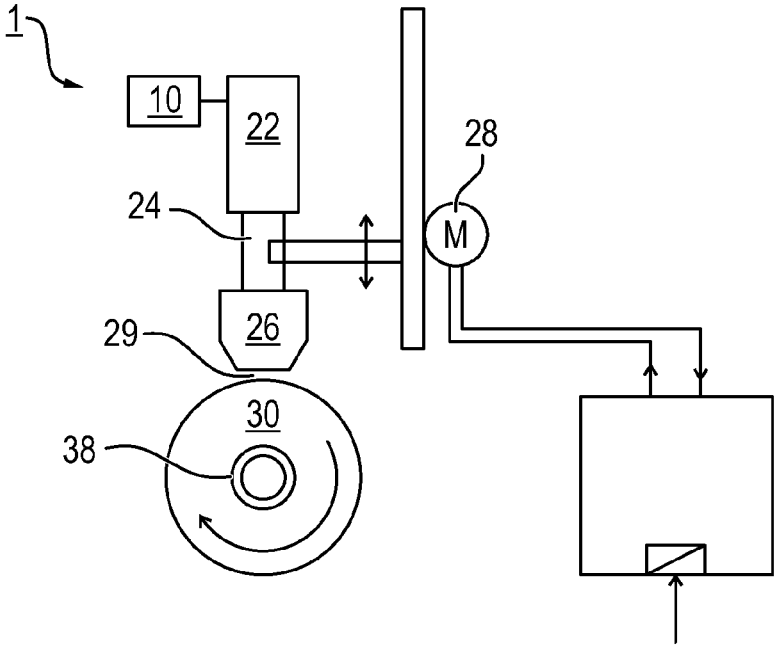
FIG. 1 a schematic depiction of a preferred embodiment of the ultrasonic processing device.

FIG. 1 shows the basic construction of an ultrasonic processing device 1. The ultrasonic processing device 1 comprises an ultrasonic generator 10, a converter 22, a booster 24, a linearly movable sonotrode 26, a roll or an anvil 30, respectively, as counter tool as well as a gap 29 formed between the sonotrode 26 and the roll 30.

By analogy to the above described construction of the ultrasonic processing device 1, it is also preferred to provide a rotatable sonotrode (not shown). Therein, at least one sonotrode is arranged within a roll. The sonotrode roll is beared or supported rotatably around a central axis. A circumferential area of the sonotrode roll comprises the function of the circumferential surface of the roll 30 described in detail below. To be able to adjust the gap between the rotating sonotrode roll and the oppositely arranged anvil, the sonotrode roll and/or the anvil (not shown) are linearly movable. The relative movement resulting from this movement between sonotrode roll and anvil ensures a specific adjustment of a width of the gap between rotating sonotrode and anvil.

In the following, the preferred construction, function and processing method of the ultrasonic processing device are described with respect to the ultrasonic processing device 1 depicted in the accompanying drawings. These explanations apply in the same way to the not-shown ultrasonic processing devices comprising for example a rotating sonotrode roll and an anvil.

The ultrasonic generator 10 creates a high-frequent electric oscillation from the supplied electrical energy or the electrical supply voltage $U_N$. The high frequent electrical oscillation or energy, respectively, is transformed in the converter or sound transducer 22 into a mechanical oscillation. The mechanical oscillation of the converter 22 is preferably amplified by the booster 24 and then transmitted to the sonotrode 26. Oppositely to the sonotrode 26, the rotatable roll 30 or the anvil, respectively, is arranged as counter tool so that the sonotrode 26 and the roll 30 are spaced from each other by the gap 29. Due to the rotatable arrangement of the roll 30, a web material 40 (not shown in FIG. 1) to be processed is moved through the gap 29 and is processed thereby by means of ultrasonics. The ultrasonic energy is introduced into the web material 40 via the sonotrode 26.

During the processing process, preferably an angular speed ω of the roll 30 is detected by an angular speed sensor 38 (step I). To be able to adjust the gap 29 and the ultrasonic processing device 1 to the web material 40, the position of the sonotrode 26 relative to the roll 30 is adjustable via an actuator 28 with position sensor or manually. Instead of an electric actuator 28 or linear motor, also a hydraulically or pneumatically operated actuator is preferred.

Resulting from the above description, by means of the ultrasonic processing device 1, different processing processes are realizable as for example the known ultrasonic welding, the ultrasonic cutting and the ultrasonic sewing. In the following, ultrasonic processing processes are described which are based in general on the example of the ultrasonic welding.

Figure 2:
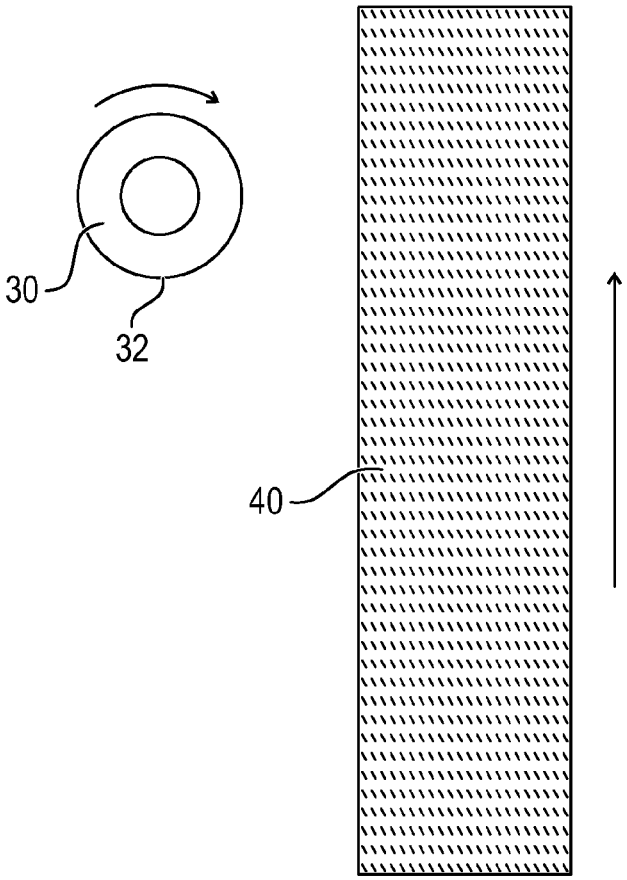
FIG. 2 a schematic depiction of a preferred roll as counter tool of the ultrasonic processing devices having an even circumferential contour as well as a material web welded therewith ultrasonically, preferably comprising a plurality of material layers.
Figure 3:
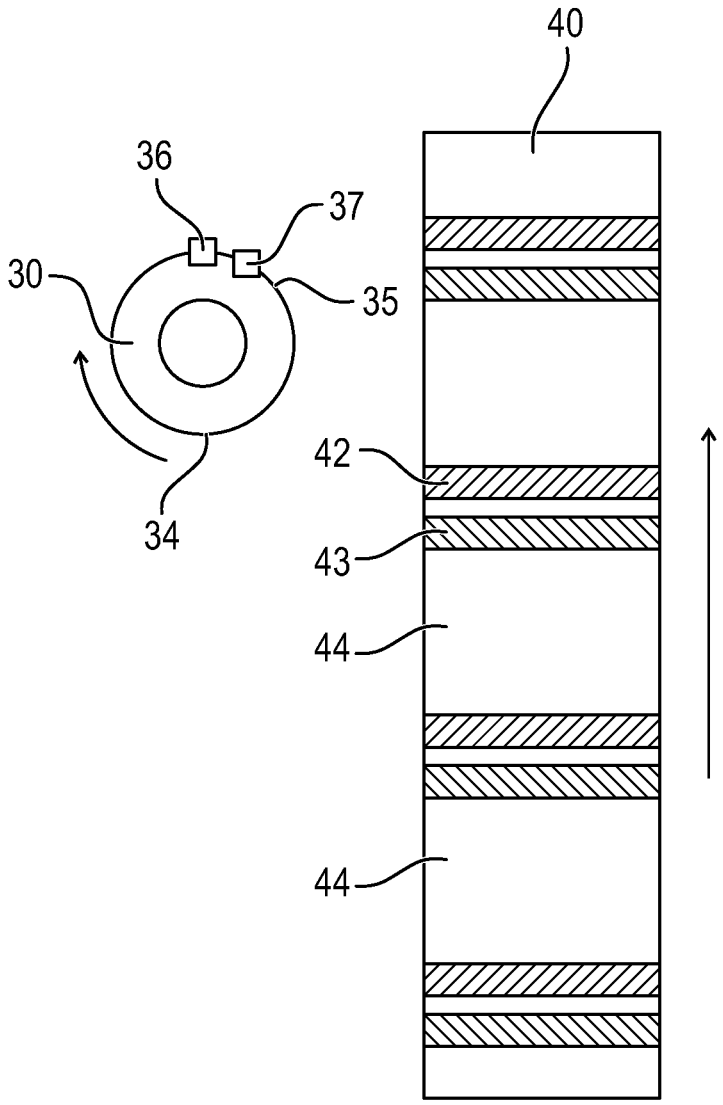
FIG. 3 a schematic depiction of a preferred embodiment of a roll as counter tool of the ultrasonic processing device having an uneven circumferential contour as well as a material web welded therewith ultrasonically, preferably comprising a plurality of material layers.

The FIGS. 2 and 3 show schematically different preferred configurations of the roll 30. FIG. 2 illustrates a roll having an even circumferential surface 32. By means of the even circumferential surface 32, an even processing pattern, preferably a welding pattern, is created on a first material web 40. The material web 40 consists, according to a preferred embodiment of the present invention, of a plurality of material layers arranged above each other. A thus processed material web 40 is also called a constant welding application or in general, constant or continuous processing application. Such continuous welding applications are also called surface welding with non-interrupted welding contours. The surface occupancy of the roll 30 or the welding power, respectively, is constant over the complete welding contour for one revolution of the roll 30.

FIG. 3 illustrates a roll 30 having an uneven circumferential surface 34. On the uneven circumferential surface 34, at least one detectable contour 36, 37 is provided, which is formed in an elevated way with respect to adjacent roll portions 35. The detectable contour 36, 37 protrudes in the direction of the sonotrode 26 from the uneven circumferential surface 34 and periodically constricts the gap 29 during the rotation of the roll 30. Preferably, the contour 36, 37 extends transversely to the circumferential direction of the roll and is thus also called transverse contour 36, 37. By means of the rotation of the roll 30, the material layer of the web materials 40 arranged above each other is preferably welded in the area of the contours 36, 37 so that so-called transverse seams 42, 43 are created in the web material 40. The contours 36, 37 may also extend in an angle distinct from 90° with respect to the circumferential direction of the roll 30. Further, it is preferred to provide also the contours 36, 37 continuously or discontinuously, which means in constant or varying height. As such contours 36, 37 are also used for welding curved patterns, seam courses and surfaces as for example for producing gloves from web material, the contours 36, 37 have arbitrary courses with respect to the circumferential direction of the roll 30 with arbitrary elevation levels. Accordingly, the term "contour" means these arbitrary courses of roll elevations and the term "transverse seam" means the seams created by means of these arbitrary contours.

Between these transverse seams 42, 43 of the welded material web, the portions 44 are arranged. In the portion 44, the web material is welded differently, for example less or not at all, compared to the portion of the transverse seams 42, 43. From this it follows that at an uneven welding contour 36 of the roll 30, the surface occupancy of the roll and thus the welding power varies over one revolution of the roll. At the same time, the surface occupancy of the roll is completely processed by one revolution of the roll and the respective welding pattern is impressed into the web material 40 (see FIG. 3). Due to the rotatory constructed ultrasonic processing device 1 with the rotating roll 30, the repeatability of the processing processes between the sonotrode 26 and the roll 30 is given, wherein these processing processes are detectable (see below).

In the ultrasonic generator 10, the electric energy is transformed into a high-frequent electrical oscillation. For this purpose, the ultrasonic generator 10 comprises an analog power unit 12. Further, from this power unit 12, a plurality of generator data is detectable via a signal detection 14. The generator data comprises all or a selection of the following data sets: electrical ultrasonic voltage $U_{us}$, electrical ultrasonic current I, amplitude actual value $A_{ist}$ of the ultrasonic oscillation and ultrasonic generator power actual value $P_{ist}$.

The ultrasonic generator 10 also comprises an internal signal processing 16, preferably a digital signal processing by means of which at least a selection of the generator data is processible. The signal processing 16 comprises a system time or clock, respectively, like every common PC or industry computer so that the system time is available as reference signal of the signal processing 16. Until now, the signal processing 16 was used among others for controlling and/or regulating the frequency of the ultrasonic signal. For example, a controlling electronic and a controlling software was used for regulating the ultrasonic frequency to the resonance frequency of the ultrasonic processing device. By means of the signal detection 14 and the signal processing 16, the generator data is detectable depending on the time and can be evaluated. This evaluation, which does not necessarily require a depiction, is illustrated in a qualitative way for an ultrasonic welding method with a roll 30 having an uneven circumferential surface 34 in FIG. 4. The rotation of the roll 30 with one or a plurality of contours 36, 37, here preferably two transverse contours, creates in the generator data timely periodically repeating peaks $P_{36}$ and $P_{37}$. From each revolution of the roll 30, a peak $P_{36}$, $P_{37}$ per contour 36, 37 results. Thus, the timely distance between two similar peaks $P_{36}$ or $P_{37}$ signalizes one complete revolution U of the roll 30. In case the transverse contour is moved past the sonotrode 26 and reduces the gap 29, an ultrasonic processing, preferably an ultrasonic welding of the web material, occurs in the area of the transverse contour 36. In this timely range, which is periodically repeated with each revolution U of the roll 30, the ultrasonic amplitude A is temporarily decreased. At the same time, the ultrasonic frequency F, the ultrasonic current I and the ultrasonic generator power P increase as can be seen based on the positive and negative peaks in FIG. 4. The ultrasonic voltage $U_{us}$ also shows a signal variation in the timely processing range of the transverse contour 36 which recognizably returns timely periodically. Thus, the data detected depending on the time shows typical and timely periodically repeating patterns in the timely portions of the ultrasonic processing of the material web 40 by means of the uneven circumferential surface 34 of the roll 30 of the ultrasonic processing device 1. These repeating patterns have preferably the shape of positive or negative peaks or of characteristic variations plotted over the time. These patterns are automatically detectable by means of a filter (not shown) or another suitable evaluation electronic. Based thereon, preferably the time point or the time range of the respective pattern and the timely distance between direct and multiple sequenced similar and non-similar patterns are determinable. Similar patterns describe a signal variation of the same physical quantity, as for example the ultrasonic voltage $U_{us}$, caused by the same contour 36 or 37. Non-similar patterns describe signal variations of the same physical quantity but caused by different contours 36; 37 on the roll 30.

Thus, from one or a plurality of data sets of the generator data, it is recognizable when and over which time range web material is processed in the gap 29. Further, from the timely distance of two similar peaks or patterns, for example $P_{36}$ or $P'_{36}$ it is recognizable in which time one revolution U of the roll 30 is completed. On this basis, preferably a controlling/regulating module 50 (see below) or the signal processing 16 determines the present angular speed ω of the roll 30 from the timely distance of two subsequent similar patterns which have been caused by the same transverse contour 36; 37 (step II). Especially, an angular segment of 360° is divided by the predetermined timely distance. It is also preferred to divide the number of the detected revolutions U by the time required therefore to get the rotation speed of the roll 30 for usage in the further preferred processing steps. It is further preferred to determine the timely distance of two subsequent and non-similar patterns which have been caused by different transverse contours 36, 37 as the construction of the roll 30 and thus also the angular segment between the transverse contours 36, 37 is known, also the angular speed of the roll 30 is determinable from the quotient of the angular segment between the transverse contours 36, 37 and the sensed timely distance.

The ultrasonic generator 10 comprises further the controlling/regulating module 50 which is integrated into the signal processing 16 of the ultrasonic generator 10. Preferably, the signal processing 16 and the controlling/regulating module 50 are realized digitally. Indeed, at a preferred analog power unit 12, an analog-digital (A/D) transducer for transmitting the detected analog generator data to the digital signal processing 16 and to the controlling/regulating module 50 is necessary but overall, the digital implementation of the signal processing 16 and the controlling/regulating module 50 realizes a faster data processing compared to known systems.

A further advantage of the integration of the controlling/regulating module into the signal processing 16 of the ultrasonic generator 10 consists in that preferably all or a selection of generator data is available for the controlling/regulating module 50 in real time without a long transmitting path and the time losses connected therewith. This realizes a faster and more precise regulating process and thus more constant and better ultrasonic welding connections compared to the prior art. Preferably, the signal detection 14 detects and transmits a selection or all of the above-mentioned generator data of the ultrasonic generator 10 within a time range of 1 to 100 μs, preferably in less than 80 μs and further preferred in less than 50 μs to the signal processing 16 and especially to the controlling/regulating module 50 with the gap regulator 60 and the amplitude regulator 70 (see above). In known systems, generator data is provided to an external controller. The transmitting of the generator data takes place partly via a plurality or several A/D (analog/digital) and D/A (digital/analog) transducers with transducing times of up to 10 ms. In the controller of the prior art, which is external of the ultrasonic generator, data processing processes were realized in the range of 5 to 50 ms. The subsequent transmitting of the controlling signals, for example for positioning the sonotrode, required further 5 to 10 ms. In sum, disadvantageous reaction times of individual components as well as the whole ultrasonic processing device of the prior art result so that a reaction to undesired processing situations could be realized only slowly compared to the present invention.

Figure 5:
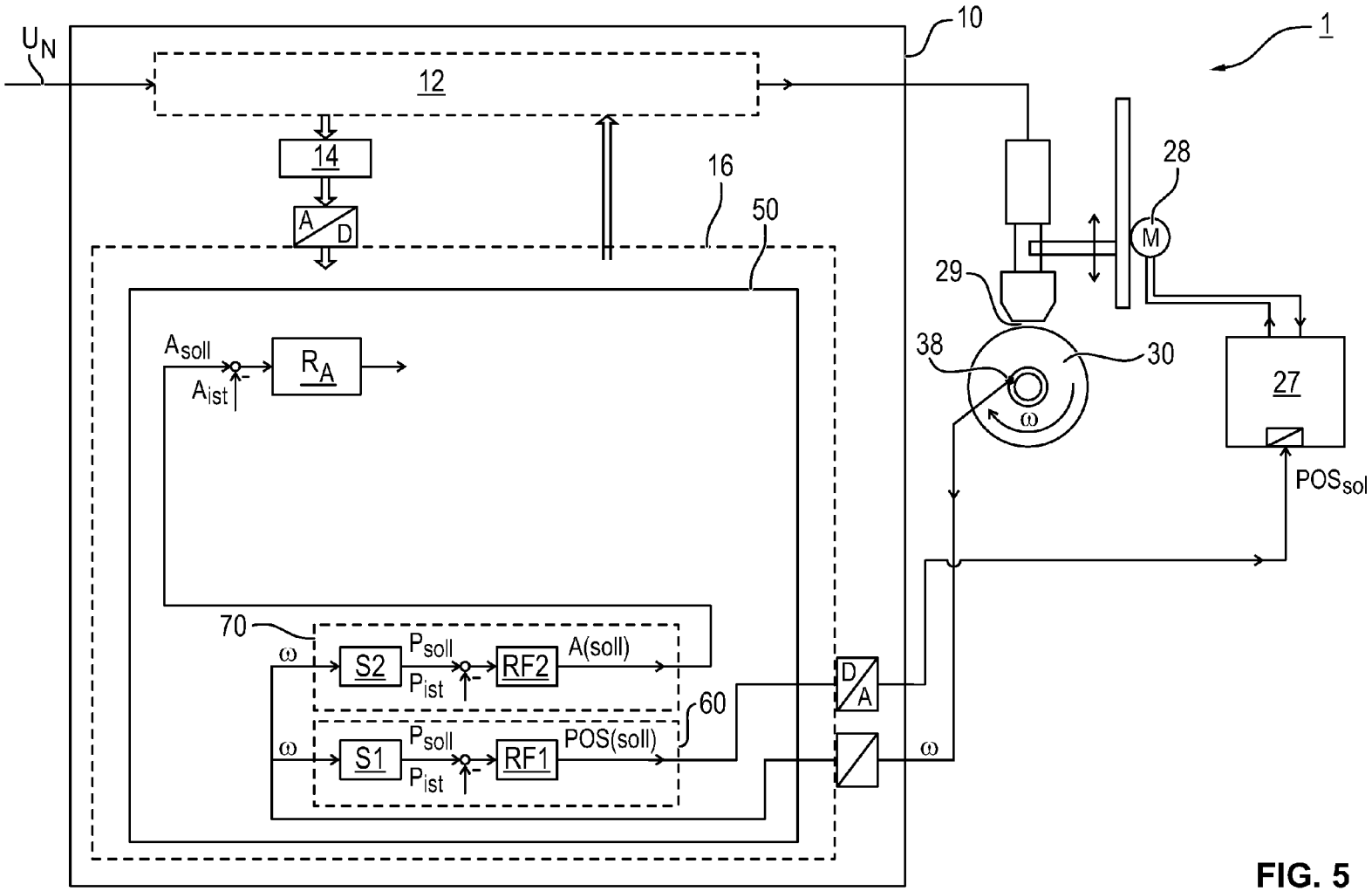
FIG. 5 a schematic depiction of a preferred embodiment of the ultrasonic processing device having a roll with even circumferential contour.
Figure 6:
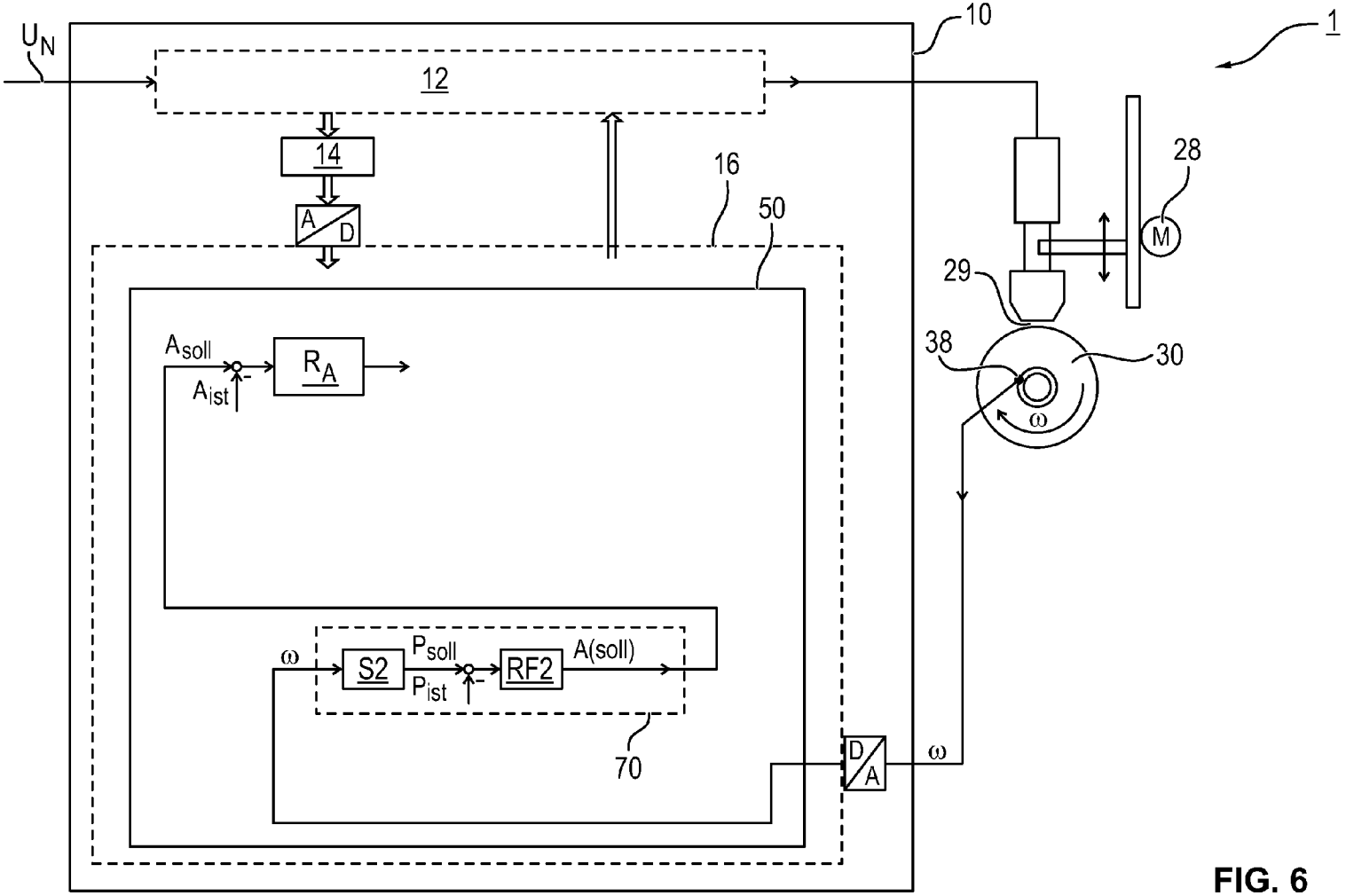
FIG. 6 a schematic depiction of a further preferred embodiment of the ultrasonic processing device having a roll with even circumferential contour.

FIG. 5 shows a schematic block diagram of a preferred embodiment of the ultrasonic processing device 1. The ultrasonic processing device 1 operates with a roll 30 having an even circumferential surface 32 (see above). Further, the roll 30 is provided with the angular speed sensor 38 detecting the angular speed ω of the roll 30 and transmitting it to the integrated controlling/regulating module 50. Further, the ultrasonic processing device 1, here preferably an ultrasonic welding device, comprises the actuator 28 with position sensor for adjusting the sonotrode position and thus the width of the gap 29. The actuator 28 is connected to a position regulator 27 receiving a reference position $POS_{soll}$ of the sonotrode 26 from the controlling/regulating module 50 and adjusting this reference position $POS_{soll}$ by means of the actuator 28.

The integrated controlling/regulating module 50 comprises a gap regulator 60 and an amplitude regulator 70 comprising preferably a PID-regulator. Both regulators 60, 70 serve the regulating of the energy input into the material web, which is moved through the gap 29 by means of the rotation of the roll 30. The gap regulator 60 and the amplitude regulator 70 are usable preferably alone or in combination. For this purpose, the gap regulator 60 determines a reference position $POS_{soll}$ of the sonotrode 26 relative to the roll 30 (step III) to adjust a power actual value $P_{ist}$ of the ultrasonic generator 10 to a predetermined power reference value $P_{soll}$ of the ultrasonic generator 10. This reference position $POS_{soll}$ is preferably transmitted via a digital/analog (D/A) transducer or via a field bus to the position regulator 27 of the sonotrode 26. The position regulator 27 regulates then the reference position $POS_{soll}$ of the sonotrode 26, while it uses the actual position of the sonotrode 26 from the position sensor for a comparison (step IV).

For determining the reference position $POS_{soll}$ of the sonotrode 26, the gap regulator 60 first receives the angular speed ω of the roll 30 from the angular speed sensor 38. It is also preferred that the angular speed sensor 38 transmits a reference signal for the angular speed ω of the roll 30 to the controlling/regulating module 50, which is then transformed by the controlling/regulating module 50 into an angular speed ω of the roll 30. The determined angular speed ω of the roll 30 is transmitted to a memory S1 of the gap regulator 60. In the memory S1, a learned characteristic curve and/or a characteristic value chart and/or a plurality of taught characteristic values is saved which specify alone or in combination the reference power $P_{soll}$ of the ultrasonic generator 10 for the material processed in the gap 29 depending on the angular speed ω of the roll 30. The reference power $P_{soll}$ of the ultrasonic generator determined in this way is compared with the currently effective actual power $P_{ist}$ of the ultrasonic generator 10, which has been transmitted to the gap regulator 60 from the signal detection 14. Preferably, the signal detection 14 transmits the actual power $P_{ist}$ of the ultrasonic generator 10 within a time range of 1 to 100 μs, further preferred in less than 80 μs and even more preferred in less than 50 μs to the controlling/regulating module 50 with gap regulator 60 and amplitude regulator 70. In the gap regulator 60, a processing of the present data is performed in a preferred time range of 1 to 100 μs, preferably in less than 80 μs and further preferred in less than 50 μs.

The result of this comparison of reference power $P_{soll}$ and actual power $P_{ist}$ of the ultrasonic generator 10 in the gap regulator 60 is transferred to the regulator RS1, which accordingly specifies a reference position $POS_{soll}$ of the sonotrode 26 and thus a width of the gap 26. The reference position $POS_{soll}$ of the sonotrode is transmitted to the position regulator 27 and realized, whereby the actual power $P_{ist}$ of the ultrasonic generator 10 is regulated to the reference power $P_{soll}$. The transmitting of the reference position $POS_{soll}$ to the position regulator 27 preferably occurs in a time range of 1 to 10 ms, preferably in less than 5 ms and even more preferred in less than 2 ms. The position regulator 27 realizes the predetermined reference position $POS_{soll}$ or the gap width, respectively, preferably within 20 to 50 ms, in case it is realized by an electric actuator. In case the position regulator 27 is realized by a pneumatic actuating system according to a further preferred embodiment, the predetermined reference position $POS_{soll}$ is realized within 50 to 500 ms.

The amplitude regulator 70 specifically changes the amplitude A of the ultrasonic signal. Thereby, and at the fixedly arranged sonotrode 26, the energy input into the web material in gap 29 is specifically increased when the amplitude A is increased or the energy input is decreased in case the amplitude A is decreased. A memory S2 of the amplitude regulator 70 also receives the angular speed ω of the roll 30 from the angular speed sensor 38 (see above). This occurs in an analogous way with respect to the gap regulator 60. In the memory S2, characteristic curves and/or characteristic value charts and/or taught or learned values, respectively, with respect to the processed web material are recorded for the power of the ultrasonic generator 10 depending on the rotation, especially the angular speed ω, of the roll 30. By means of the angular speed ω and the specification of the processed material in the memory S2, a reference value $P_{soll}$ for the power of the ultrasonic generator 10 can be taken (step V). This reference value $P_{soll}$ of the generator power is compared to the actual power $P_{ist}$ of the ultrasonic generator 10 received from the signal detection 14. In the regulator or filter RF2, the result of this comparison is converted into an amplitude reference value $A_{soll}$ to achieve the desired power input $P_{soll}$ of the ultrasonic generator into the web material in the gap 29 via the change of the amplitude A of the ultrasonic signal. Preferably, the signal detection 14 transmits the actual power $P_{ist}$ of the ultrasonic generator 10 within a time range of 1 to 100 μs, preferably in less than 80 μs and further preferred in less than 50 μs to the controlling/regulating module 50 with amplitude regulator 70. In the amplitude regulator 70 a processing of the present data is carried out in a preferred time range of 1 to 100 μs, preferably in less than 80 μs and further preferred in less than 50 μs.

The amplitude reference value $A_{soll}$ is transmitted to the regulator $R_A$. Based on a comparison of the amplitude actual value $A_{ist}$ and the amplitude reference value $A_{soll}$, the change of the amplitude A is determined (step VI). According to a preferred embodiment of the present invention, the regulating intervention determined for the amplitude in this way is realized electronically and the respective control signals are transmitted to the power unit 12 (see arrow in the FIGS. 5 to 8). The transmitting to the regulator $R_A$ preferably may be carried out within 1 to 100 μs, preferably in less than 80 μs and further preferred in less than 50 μs. The processing of the reference amplitude $A_{soll}$ in the regulator $R_A$ for realizing the actual amplitude $A_{ist}$ at the sonotrode 26 is preferably realized within a time range of 1 to 10 ms, preferably less than 8 ms and even more preferred in less than 5 ms.

Figure 4:
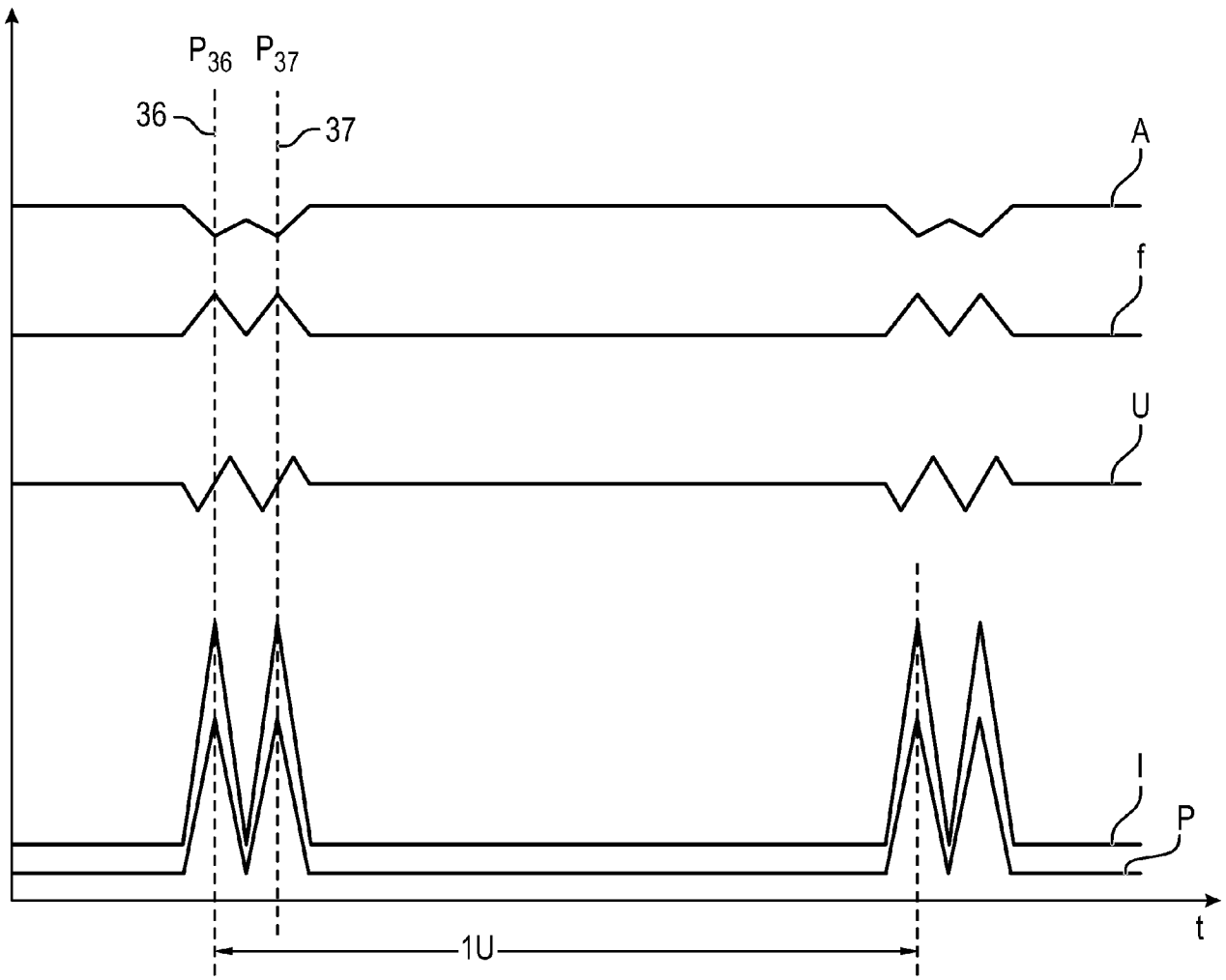
FIG. 4 a schematic depiction of the detected and evaluable generator data of the ultrasonic generator over time.

It is also preferred to regulate the ultrasonic processing device 1 only by means of the amplitude regulator 70. This preferred embodiment is shown schematically in FIG. 6. It can be seen that the gap regulator 60 was omitted. Correspondingly, the sonotrode 26 can also not be positioned via a position regulator 27. To the contrary, a defined position of the sonotrode 26 or a defined width of the gap 29 between roll 30 and sonotrode 26 is preferably adjusted and held by means of the motor 28 or by means of a similar actuator (see above). Therein, the position of the sonotrode 26 can optionally be detected and controlled by a position sensor. It is also preferred to drive the sonotrode 26 against a mechanical stop so that the position of the sonotrode 26 is fixed. According to another embodiment, the sonotrode 26 is manually adjustable and fixable at a predetermined position. As soon as the sonotrode 26 is arranged at the predetermined position, the actual power $P_{ist}$ of the ultrasonic generator 10 is regulated to the reference power $P_{soll}$ of the ultrasonic generator 10 by means of the amplitude regulator 70 according to the above described operation by means of the variation of the amplitude of the ultrasonic oscillation. According to a further preferred embodiment of the ultrasonic processing device 1 (cf. FIG. 7), the internal controlling/regulating module 50 detects the angular speed ω of the roll 30 from at least one data set of the above described generator data (cf. FIG. 4). The ultrasonic processing device 1 comprises in this case a roll 30 having an uneven circumferential contour 34. Therefore, detectable contours 36, 37 influence the timely course of the generator data (see above). The angular speed ω is derivable from the timely course of the individual generator data which are shown in FIG. 4. For this purpose, a data set, a selection of data sets or all data sets of the generator data are transmitted to a trigger block TB. In the trigger block TB, the time dependent detected data sets of the generator data according to FIG. 4 are evaluated. The evaluation determines at which time positions positive or negative peaks $P_{36}$, $P_{37}$ or repeating patterns or signal variations, respectively, are present. Based on common processing speeds of the material web 40 and the angular speeds to of the roll 30 connected therewith, the peaks $P_{36}$, $P_{37}$ or patterns are repeated preferably 2 to 80 times per second, preferably 2 to 50 times and further preferred 2 to 20 times per second, depending on the specific application. As the roll 30 is rotating for longer processing times of several hours up to several days during the operation with constant revolution, the peaks $P_{36}$, $P_{37}$ are repeated in regular timely distances. These regular timely distances respectively correspond to one complete revolution U of the roll 30 while the detectable contours 36, 37 of the uneven circumferential contour 32 each passes one time the sonotrode 26. The trigger block TB determines the time range, preferably the time point, at which the detectable contours 36, 37 pass the sonotrode 26. In this time range or at this time point, the material web 40 is processed, preferably welded. The time signal which serves as reference is preferably provided by the system time of the controlling/regulating module 50 or the signal processing 16. Therefore, from the evaluation of the trigger block TB it is known with which timely distance a periodically repeating processing occurs, how long this processing takes and when a processing occurs with respect to the system time, in case the timely positions of the first peaks $P_{36}$, $P_{37}$ of the detectable contours 36, 37 are known. It follows therefrom that by means of the trigger block TB the information, in which specific time ranges as timely fractional parts or as angular segment or as angular position segment of a revolution U of the roll 30 really only a processing of the material web occurs, is provided to the controlling/regulating module 50.

From the data of the trigger block TB a processing block BB10 determines the angular speed ω of the roll 30. To this end, preferably the processing block BB10 divides the rotation angle of a revolution, i.e. 360°, by the time per revolution U. For increasing the precision, preferably also the rotation angle of several revolutions U can be divided by the time required therefore. The determined angle speed ω is then transmitted to the amplitude regulator 70 and/or the gap regulator 60. In a further preferred processing block BB20, a respective angular position of the detectable contours 36, 37 is determined. Based on a timely reference position, for example where preferably the detectable contours 36, 37 pass the sonotrode 26 for the first time, the time is measured. By means of the angular speed ω of the processing block BB10 and the measured time, it is always determinable at which angular position ϕ the respective detectable contour 36, 37 is presently located.

The angular position ϕ is preferably used in a measurement detection block MB. In known systems, the transmitted generator data is averaged over one revolution U of the roll 30. Therein, a disturbing superposition of the signals at the peaks $P_{36}$, $P_{37}$ or patterns—thus of the signals during the timely processing procedures of the material web—by the signals during the non-processing procedures occur—thus in case no or only small ultrasonic energy is applied to the material web. As by means of the processing block BB20, it is clearly recognizable and detectable in which time ranges actually a processing of the material web 40 occurs, the measurement detection block MB only determines in these processing time ranges the detected generator data or a selection thereof. In this way, the generator data is not superposed by signal noise in the non-processing time ranges so that a higher precision of the generator data compared to known systems is realizable.

According to a preferred embodiment of the present invention, an average value of the detected and repeated generator data due to the rotation of the roll 30 or a selection thereof is generated in the measurement detection block MB. Therefrom, a higher precision of the evaluated generator data results so that at the same time subsequent regulating or controlling processes can be realized which have a higher precision. Thereby, preferably the actual power $P_{ist}$ of the ultrasonic generator 10 is more precisely determinable which is then transmitted to the gap regulator 60 and/or the amplitude regulator 70. It is thus preferred to ignore the idle power of the ultrasonic processing device 1 in ranges outside of the contours 36, 37, which increases the precision of the detected power average value. Further, only in the areas of the peaks $P_{36}$, $P_{37}$, a data evaluation is performed and not over the whole revolution of the roll 30. This reduces the evaluation effort and the computing power related thereto.

Based on the evaluation of the generator data in the controlling/regulating module 50, the data detected via the measurement detection block MB are provided within a time range of 1 to 100 preferably in less than 80 μs and further preferred in less than 50 μs for the further processing and using. Accordingly, from the preferred combination of the generator data provided by the measurement detection block MB and the gap regulator 60 preferably reaction times of the ultrasonic processing device 1 with a gap regulator 60 result in the timely range of 20 to 60 ms with servomotor and of 50 to 500 ms with a pneumatic actuator system. For the preferred combination of the generator data provided by the measurement detection block MB with the amplitude regulator 70, preferably reaction times of the ultrasonic processing device in the range of 1 to 10 ms, preferably less than 8 ms and further preferred of less than 5 ms result.

Further, preferably the angular speeds ω and the angular position ϕ are transmitted to the blocks VSP and VSA. In block VSP a pre-controlling for determining the reference position $POS_{soll}$ of the sonotrode 26 occurs. In block VSA, a pre-controlling for determining the reference amplitude $A_{soll}$ of the ultrasonic signal occurs. The function "pre-controlling" adds to one or different correcting variables of the ultrasonic processing device 1, like preferably the reference amplitude $A_{soll}$ (step VIII) and/or the reference position $POS_{soll}$ (step VII) of the sonotrode 26, pre-control values for predictively influencing the ultrasonic processing process for an improved quality and/or reliability. The pre-control values for the reference position $POS_{soll}$ are recorded in block VSP and the pre-control values for the reference amplitude $A_{soll}$ are recorded in block VSA. As the ultrasonic processing device is a rotating system and thus has a periodically repeating processing process with each revolution of the roll 30, the pre-control values are preferably recorded as function of the angular position ϕ of the roll 30. This is also preferably a linear or a non-linear mathematic function which can be formulated depending on the parameters angular speed ω and/or rotation angle p. According to a further preferred embodiment of the present invention, the pre-control values are recorded in form of a characteristic line or in form of a characteristic field. Preferably, the characteristic field depends on the angular position ϕ and the angular speed ω of the roll 30. It is also preferred to record this characteristic field parameterized and/or to teach it to the blocks VSA and VSP during the operation of the ultrasonic processing device 1.

Figure 7:
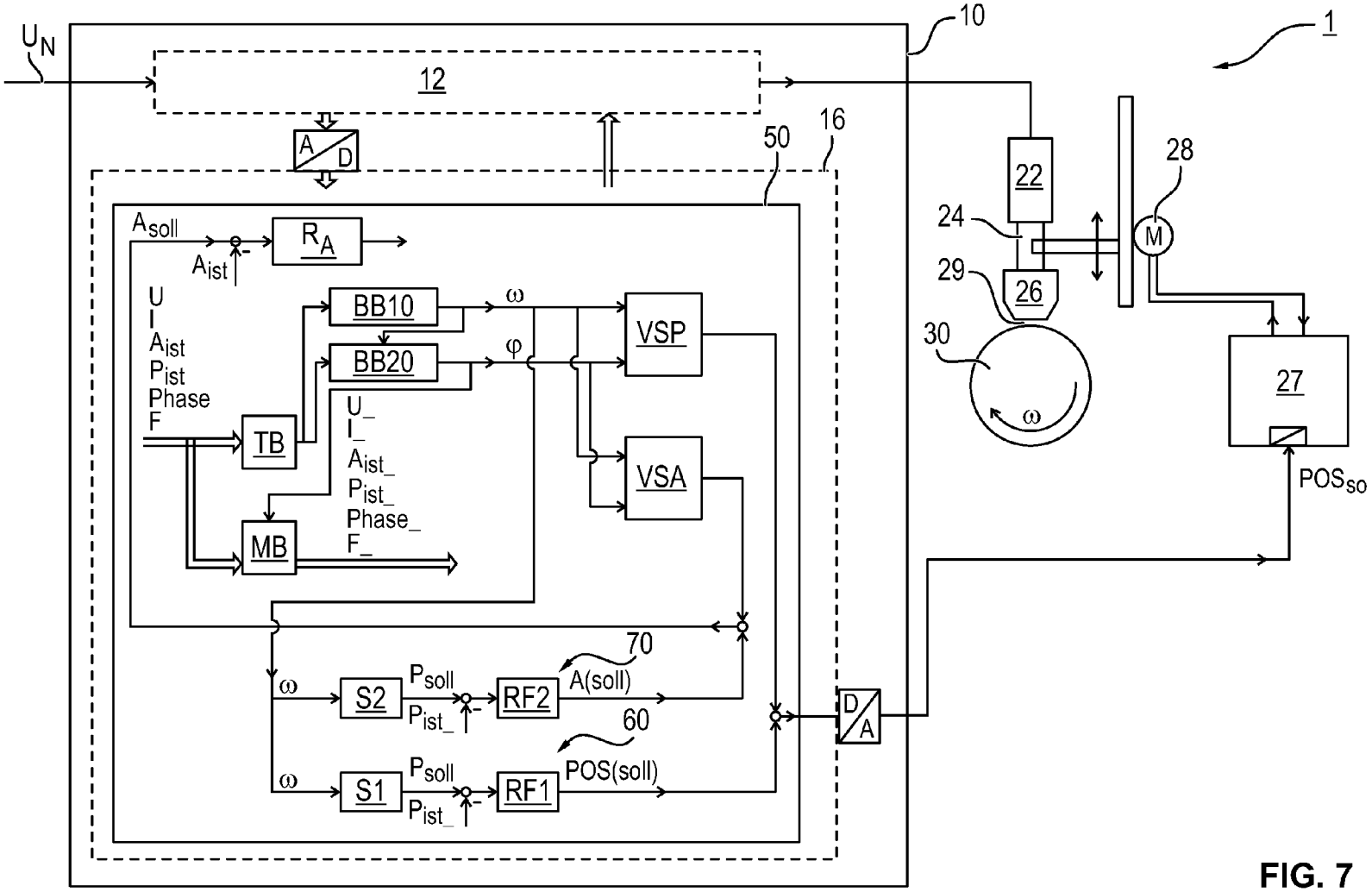
FIG. 7 a schematic depiction of a further preferred embodiment of the ultrasonic processing device having a roll with uneven circumferential contour.
Figure 8:
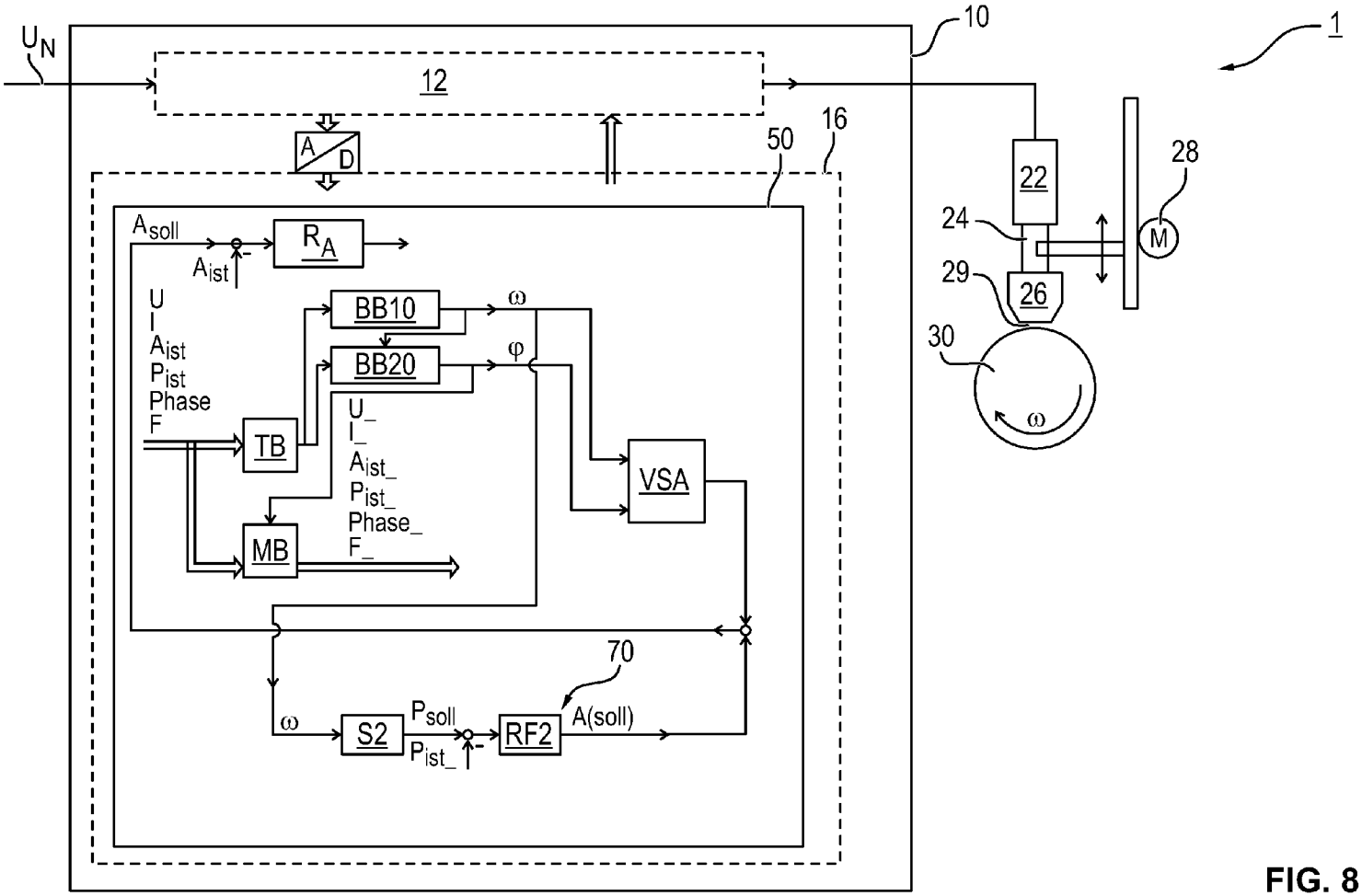
FIG. 8 a schematic depiction of a further preferred embodiment of an ultrasonic processing device having a roll with uneven circumferential contour.
Figure 9:
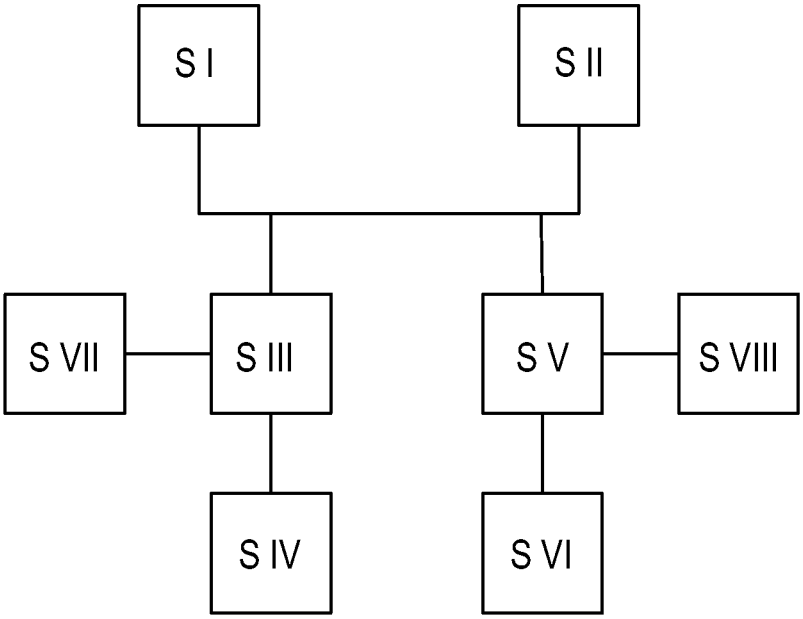
FIG. 9 a flow chart of a preferred embodiment of the ultrasonic processing method.

Based on the recorded pre-control values as function or characteristic fields, the function of the pre-control values is calculated and/or the characteristic field or the characteristic fields are read depending on the angular position ϕ and/or the angular speed w of the roll 30 during the operation of the ultrasonic processing device. The present pre-control values are then impressed to the respective actuator, here the position regulator 60 and the amplitude regulator 70, as shown in FIGS. 7 and 8. To be able to integrate the pre-control values into the timely sequence of the regulating of the ultrasonic processing device 1, a respective computing power is necessary which is ensured by the ultrasonic generator 1 and the integrated controlling/regulating module 50.

It is further preferred that the controlling/regulating module 50 of the ultrasonic generator 10 ensures short cycle times for reading the characteristic field or for calculating the function adapted to the ultrasonic processing. This ensures that the characteristic field is read accordingly often per revolution of the roll 30 and/or the function can be calculated respectively often per revolution of the roll 30. In this manner, the ultrasonic processing procedure can be optimized and a better precision and quality compared to the prior art is realizable. According to a preferred embodiment of the present invention, a pre-controlling takes place with a precision of $10^{-1o}$ of the rotation angle of the roll 30. In case a complete revolution of the roll 30 takes 200 ms, a cycle time of the blocks VSA and VSP for calculating the function and/or for reading the characteristic field of a maximum of 55 μs results. Correspondingly, other precisions are adjustable.

For accelerating the determination of the pre-control values, it is preferred that the pre-control function and the characteristic field are parameterized. This means that the function and the values of the characteristic field are each defined as mathematic terms, respectively, which depend on the parameters angular position ϕ and/or the angular speed ω of the roll 30.

The pre-control has a proactive or predictive influence, respectively, which is used preferably at the ultrasonic welding of subsequent transverse seams. By means of the pre-control, it is acted against the negative reaction force of the web material, which was discussed initially, and against the evasive movement of the sonotrode 26 related thereto. Due to the evasive movement, the gap 29 is opened to such an extent that the seam following a preceding seam does not get a suitable ultrasonic welding and has therefore not the desired strength. The pre-control determines a correction of the reference position $POS_{soll}$ and/or the reference amplitude $A_{soll}$ for the angular position $\phi$ at which the transverse contour 37 for producing the subsequent seam is present. Referring to the specific example of the evasive movement, the gap 29 is reduced due to the pre-control of the reference position $POS_{soll}$ and/or the amplitude of the ultrasonic oscillation is increased due to the pre-control of the reference amplitude $A_{soll}$. Thereby, the subsequent seam is producible with satisfying strength. It is also preferred to eliminate other disturbances in the ultrasonic processing in this manner.

FIG. 8 schematically shows a further preferred embodiment of the ultrasonic processing device 1. Here, the gap regulator 60 is omitted. Instead of this, the sonotrode 26 is manually adjusted or by means of an actuator 28 to a predetermined position and is retained there. Accordingly, a defined gap 29 is present through which the material web is moved. The power depending regulating of the ultrasonic generator 10 and thus the ultrasonic processing device 1 is realized by means of the amplitude regulator 70 as it was described above. The required condition data for the regulating or controlling by the amplitude regulator 70 is received from the trigger block TB in combination with the processing block BB10. For increasing the precision of the amplitude regulating 70, it is also preferred to supply the amplitude regulating 70 with a selection of the determined data of the measurement detection block MB. Therefore, and according to a preferred embodiment of FIG. 8, the actual power $P_{ist}$ of the ultrasonic generator 10 determined by the average block MB is transmitted to the amplitude regulating 70. Further, it is preferred to combine the above described pre-control with the block VSA with the amplitude regulator 70.

Further Forms and Embodiments

The following numbered paragraphs and sentences further describe forms and embodiments that may be carried out independently or in various combinations.

1. Ultrasonic processing device comprising the following features: an ultrasonic generator, a converter and at least one sonotrode with an oppositely arranged counter tool, which are spaced from each other by a gap, wherein the sonotrode or the counter tool is arranged rotatably and comprises an even circumferential surface, a controlling/regulating module, preferably a digital controlling/regulating module, which is integrated into a signal processing of the ultrasonic generator so that a plurality of generator data with respect to the ultrasonic generator are processible in the ultrasonic generator, especially an electric voltage U, an electric current I, an actual amplitude $A_{ist}$ and/or an actual generator power $P_{ist}$, wherein
   a. a power actual value $P_{ist}$ is comparable with a power reference value $P_{soll}$ of the ultrasonic generator by means of a gap regulator in the controlling/regulating module to specify a position reference value $POS_{soll}$ of the sonotrode relative to the counter tool for adjustment of the power reference value $P_{soll}$ of the ultrasonic generator, and/or wherein
   b. a power actual value $P_{ist}$ is comparable with a power reference value $P_{soll}$ of the ultrasonic generator by means of an amplitude regulator in the controlling/regulating module to specify an amplitude reference value $A_{soll}$ to the ultrasonic generator for adjustment of the power reference value $P_{soll}$ of the ultrasonic generator.
2. Ultrasonic processing device according to embodiment 1, wherein with respect to the ultrasonic processing device an angular speed $\omega$ of the rotatably arranged counter tool or the rotatably arranged sonotrode is detectable by means of an external sensor, which is transmittable to the gap regulator and/or the amplitude regulator within the ultrasonic device.
3. Ultrasonic processing device comprising the following features: an ultrasonic generator, a converter and at least one sonotrode with an oppositely arranged counter tool, which are spaced from each other by a gap, wherein the sonotrode or the counter tool is arranged rotatably and comprises an uneven circumferential surface, a controlling/regulating module, preferably a digital controlling/regulating module, which is integrated in a signal processing of the ultrasonic generator so that with respect to the ultrasonic generator a plurality of generator data is processible in the ultrasonic generator, especially an electric voltage U, an electric current I, an actual amplitude $A_{ist}$ and/or an actual generator power $P_{ist}$, wherein
   a. a power actual value $P_{1st}$ is comparable with a power reference value $P_{soll}$ of the ultrasonic generator by means of a gap regulator in the controlling/regulating module to specify a position reference value $POS_{soll}$ of the sonotrode relative to the counter tool for adjustment of the power reference value $P_{soll}$ of the ultrasonic generator, and/or wherein
   b. a power actual value $P_{ist}$ is comparable with a power reference value $P_{soll}$ of the ultrasonic generator by means of an amplitude regulator to specify an amplitude reference value $A_{soll}$ to the ultrasonic generator for adjustment of the power reference value $P_{soll}$ of the ultrasonic generator.
4. Ultrasonic processing device according to embodiment 3, wherein the uneven circumferential surface of the roll or the sonotrode comprises at least one detectable contour creating in at least one data set of the plurality of generator data plotted against a time at least one timely periodically repeating pattern due to a rotation of the roll or the sonotrode so that based on a system time of the controlling/regulating module in the controlling/regulating module an angular speed of the roll is determinable without an external sensor at the roll.
5. Ultrasonic processing device according to one of the preceding embodiments, wherein the counter tool is a roll and the sonotrode is arranged adjustable with respect to the roll so that a reference position $POS_{soll}$ of the sonotrode with defined gap relative to the roll is detectable via a position sensor and is adjustable by means of an actuator.
6. Ultrasonic processing device according to one of the preceding embodiments, wherein the amplitude regulator operates digitally so that the power actual value $P_{ist}$ of the ultrasonic generator is adjustable within the controlling/regulating module.
7. Ultrasonic processing device according to embodiment 6, wherein the amplitude regulator is provided without gap regulator and at adjusted gap width between the counter tool, preferably a roll, and the sonotrode, a distance between the sonotrode and the counter tool is regulatable by means of the adjustment of the amplitude reference value.

8. Ultrasonic processing device according to embodiment 7, wherein the adjustable sonotrode or the adjustable counter tool is fixedly arrangeable during the operation of the ultrasonic processing device so that a motoric positioning of the sonotrode or the counter tool by means of a position sensor is not required.

9. Ultrasonic processing device according to one of the embodiments 1 to 7, wherein the gap regulator and the amplitude regulator are used in combination so that the power reference value $P_{soll}$ of the ultrasonic generator is regulatable by means of an active gap adjustment in combination with an amplitude adjustment of the sonotrode.

10. Ultrasonic processing device according to one of the preceding embodiments 3 to 9 in combination with embodiment 4, wherein processing times of the ultrasonic processing device are recognizable by means of the controlling/regulating module in the timely periodically repeating patterns so that controlling and regulating processes for the power actual value $P_{ist}$ of the generator and/or the amplitude actual value $A_{ist}$ and/or the position reference value $POS_{soll}$ are only performed during these processing times.

11. Ultrasonic processing device according to one of the preceding embodiments, wherein the gap regulator has a reaction time of the ultrasonic processing device on controlling/regulating interventions of the controlling/regulating module in a range <50 ms.

12. Ultrasonic processing device according to one of the preceding embodiments, wherein the amplitude regulator has a reaction time of the ultrasonic processing device on controlling/regulating interventions of the controlling/regulating module in the range of <10 ms, preferably <8 ms and especially <5 ms.

13. Ultrasonic processing method of an ultrasonic processing device, comprising:

an ultrasonic generator, a converter and at least one sonotrode with an oppositely arranged counter tool, which are spaced from each other by a gap, wherein the sonotrode or the counter tool is arranged rotatably and comprises an even or an uneven circumferential surface, a controlling/regulating module, preferably a digital controlling/regulating module, integrated in a signal processing of the ultrasonic generator so that with respect to the ultrasonic generator a plurality of generator data is processible in the ultrasonic generator, especially an electric voltage U, an electric current I, an actual amplitude $A_{ist}$ and/or an actual generator power $P_{ist}$, wherein the ultrasonic processing method comprises the following steps:

a. determining an angular speed (step I) of the rotatably arranged counter tool or the rotatably arranged sonotrode, b. detecting (step II) at least one data set of the plurality of generator data, c. comparing a power actual value $P_{ist}$ with a power reference value $P_{soll}$ of the ultrasonic generator in a gap regulator and specifying a position reference value $POS_{soll}$ of the sonotrode with respect to the counter tool and/or d. comparing a power actual value $P_{ist}$ with a power reference value $P_{soll}$ of the ultrasonic generator and specifying an amplitude reference value in the ultrasonic generator for adjusting the power reference value $P_{soll}$ of the ultrasonic generator.

14. Ultrasonic processing method according to embodiment 13 having a roll with even circumferential surface as counter tool, comprising the further steps:

detecting an angular speed of the roll with an external sensor at the roll and transmitting the detected angular speed to the gap regulator and/or the amplitude regulator.

15. Ultrasonic processing method according to embodiment 13 having a roll with uneven circumferential surface as counter tool, which has at least one detectable contour, wherein the ultrasonic processing method comprises the further steps:

detecting at least one data set of the plurality of generator data over a plurality of revolutions of the roll, evaluating timely periodically occurring patterns in at least one data set of the plurality of generator data plotted against the time based on a system time of the controlling/regulating module so that an angular speed of the roll is determinable without external sensor, and transmitting the angular speed to the gap regulator and/or the amplitude regulator.

16. Ultrasonic processing method according to embodiment 15, comprising the further step:

determining processing times in the timely range of the periodically occurring patterns and performing of evaluating and/or controlling and/or regulating processes for the power actual value $P_{ist}$ of the ultrasonic generator and/or the amplitude actual value $A_{ist}$ and/or the position reference value $POS_{soll}$ only during the processing times.

17. Ultrasonic processing method according to one of the preceding embodiments 13 or 14, comprising the further step:

adjusting a reference position $POS_{soll}$ of the sonotrode with defined gap relative to the roll by means of a position sensor and an actuator.

18. Ultrasonic processing method according to one of the embodiments 13, 15 or 16, comprising the further step:

adjusting a fixed gap between the sonotrode and the roll, wherein no position sensor with actuator is required, and regulating the power reference value $P_{soll}$ of the ultrasonic generator by adjusting the amplitude reference value $A_{soll}$ of the sonotrode.

19. Ultrasonic processing method according to one of the embodiments 13, 15 or 16, comprising the further step:

adjusting the power reference value $P_{soll}$ of the ultrasonic generator by means of the gap regulator and the amplitude regulator in combination, wherein the power reference value $P_{soll}$ of the ultrasonic generator is regulatable by means of an active gap adjustment in combination with an amplitude adjustment of the sonotrode.

20. Ultrasonic processing method according to embodiment 18, comprising the further step:

overriding or lock-on of a pre-controlling function on the amplitude regulator and/or the position regulator so that a predictive amplitude regulating is carried out.

21. Ultrasonic processing method according to embodiment 15, comprising the further step:

determining of processing times of the ultrasonic processing device based on the timely periodically occurring patterns and overriding a pre-controlling function onto at least one correcting variable at the determined processing times so that systemic timely displacements or disturbing influences in the correcting variables at the processing of the material webs are considered predictively.

22. Ultrasonic processing method according to one of the embodiments 13 to 21, wherein the gap regulator has a reaction time of the ultrasonic processing device on controlling/regulating interventions of the controlling/regulating module in a range <50 ms.

23. Ultrasonic processing method according to one of the embodiments 13 to 22, wherein the amplitude regulator has a reaction time of the ultrasonic processing device on controlling/regulating interventions of the controlling/regulating module in the range of <10 ms, preferably <8 ms and especially <5 ms.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. Ultrasonic processing method of an ultrasonic processing device, comprising:

an ultrasonic generator, a converter and at least one sonotrode with an oppositely arranged counter tool, which are spaced from each other by a gap, wherein the sonotrode or the counter tool is arranged rotatably and comprises an even or an uneven circumferential surface, a controlling/regulating module *arranged in the ultrasonic generator and* integrated in a signal processing of the ultrasonic generator so that with respect to the ultrasonic generator a plurality of generator data is processible in the ultrasonic generator, [especially an electric voltage U, an electric current I, an actual amplitude $A_{ist}$ and/or an actual generator power $P_{ist}$] wherein the ultrasonic processing method comprises the following steps:

a. determining an angular speed (step I) of the rotatably arranged counter tool or the rotatably arranged sonotrode *and transmitting the determined angular speed to a gap regulator and/or an amplitude regulator*, b. detecting (step II) at least one data set of the plurality of generator data, c. comparing a power actual value $P_{ist}$ with a power reference value $P_{soll}$ of the ultrasonic generator in [a] *the* gap regulator and specifying a position reference value $POS_{soll}$ of the sonotrode with respect to the counter tool, *wherein the gap regulator has a reaction time of the ultrasonic processing device on controlling/regulating interventions of the controlling/regulating module in a range <50 ms* and/or d. comparing a power actual value $P_{ist}$ with a power reference value $P_{soll}$ of the ultrasonic generator *in the amplitude regulator* and specifying an amplitude reference value $A_{soll}$ in the ultrasonic generator for adjusting the power reference value $P_{soll}$ of the ultrasonic generator, *wherein the amplitude regulator has a reaction time of the ultrasonic processing device on controlling/regulating interventions of the controlling/regulating module in the range of <10 ms*.

2. Ultrasonic processing method according to claim 1 having a roll with even circumferential surface as counter tool, comprising the further steps:

detecting an angular speed of the roll with an external sensor at the roll and transmitting the detected angular speed to the gap regulator and/or the amplitude regulator.

3. Ultrasonic processing method according to claim 1 having a roll with uneven circumferential surface as counter tool, which has at least one detectable contour, wherein the ultrasonic processing method comprises the further steps:

detecting at least one data set of the plurality of generator data over a plurality of revolutions of the roll, evaluating timely periodically occurring patterns in at least one data set of the plurality of generator data plotted against the time based on a system time of the controlling/regulating module so that an angular speed of the roll is determinable without external sensor, and transmitting the angular speed to the gap regulator and/or the amplitude regulator.

4. Ultrasonic processing method according to claim 3, comprising the further step:

determining processing times in the timely range of the periodically occurring patterns and performing of evaluating and/or controlling and/or regulating processes for the power actual value $P_{ist}$ of the ultrasonic generator and/or the amplitude actual value $A_{ist}$ and/or the position reference value $POS_{soll}$ only during the processing times.

5. Ultrasonic processing method according to claim 1, comprising the further step:

adjusting a reference position $POS_{soll}$ of the sonotrode with defined gap relative to the [roll] *counter tool* by means of a position sensor and an actuator.

6. Ultrasonic processing method according to claim 1, comprising the further step:

adjusting a fixed gap between the sonotrode and the [roll] *counter tool*, wherein no position sensor with actuator is required, and regulating the power reference value $P_{soll}$ of the ultrasonic generator by adjusting the amplitude reference value $A_{soll}$ of the sonotrode.

7. Ultrasonic processing method according to claim 1, comprising the further step:

adjusting the power reference value $P_{soll}$ of the ultrasonic generator by means of the gap regulator and the amplitude regulator in combination, wherein the power reference value $P_{soll}$ of the ultrasonic generator is regulatable by means of an active gap adjustment in combination with an amplitude adjustment of the sonotrode.

8. Ultrasonic processing method according to claim 6, comprising the further step:

overriding or lock-on of a pre-controlling function on the amplitude regulator and/or [the] *a* position regulator so that a predictive amplitude regulating is carried out.

9. Ultrasonic processing method according to claim 3, comprising the further step:

determining of processing times of the ultrasonic processing device based on the timely periodically occurring patterns and overriding a pre-controlling function onto at least one correcting variable at the determined processing times so that systemic timely displacements or disturbing influences in the correcting variables at the processing of the material webs are considered predictively.

[10. Ultrasonic processing method according to claim 1, wherein the gap regulator has a reaction time of the ultrasonic processing device on controlling/regulating interventions of the controlling/regulating module in a range <50 ms.]

[11. Ultrasonic processing method according to claim 1, wherein the amplitude regulator has a reaction time of the ultrasonic processing device on controlling/regulating interventions of the controlling/regulating module in the range of <10 ms.]

12. Ultrasonic processing method according to claim 2, comprising the further step:

adjusting a reference position $POS_{soll}$ of the sonotrode with defined gap relative to the roll by means of a position sensor and an actuator.

13. Ultrasonic processing method according to claim 3, comprising the further step:

adjusting a fixed gap between the sonotrode and the roll, wherein no position sensor with actuator is required, and regulating the power reference value $P_{soll}$ of the ultrasonic generator by adjusting the amplitude reference value $A_{soll}$ of the sonotrode.

14. Ultrasonic processing method according to claim 4, comprising the further step:

adjusting a fixed gap between the sonotrode and the roll, wherein no position sensor with actuator is required, and regulating the power reference value $P_{soll}$ of the ultrasonic generator by adjusting the amplitude reference value $A_{soll}$ of the sonotrode.

15. Ultrasonic processing method according to claim 3, comprising the further step:

adjusting the power reference value $P_{soll}$ of the ultrasonic generator by means of the gap regulator and the amplitude regulator in combination, wherein the power reference value $P_{soll}$ of the ultrasonic generator is regulatable by means of an active gap adjustment in combination with an amplitude adjustment of the sonotrode.

16. Ultrasonic processing method according to claim 15, comprising the further step:

overriding or lock-on of a pre-controlling function on the amplitude regulator and/or the position regulator so that a predictive amplitude regulating is carried out.

17. Ultrasonic processing method according to claim 4, comprising the further step:

adjusting the power reference value $P_{soll}$ of the ultrasonic generator by means of the gap regulator and the amplitude regulator in combination, wherein the power reference value $P_{soll}$ of the ultrasonic generator is regulatable by means of an active gap adjustment in combination with an amplitude adjustment of the sonotrode.

18. Ultrasonic processing method according to claim 17, comprising the further step:

overriding or lock-on of a pre-controlling function on the amplitude regulator and/or the position regulator so that a predictive amplitude regulating is carried out.

*19. An ultrasonic processing method of an ultrasonic processing device, comprising:*

*an ultrasonic generator, a converter and at least one sonotrode with an oppositely arranged counter tool, which are spaced from each other by a gap, wherein the counter tool is arranged rotatably and comprises an uneven circumferential surface having at least one detectable contour, a controlling/regulating module integrated in a signal processing of the ultrasonic generator so that with respect to the ultrasonic generator a plurality of generator data is processable in the ultrasonic generator, wherein the ultrasonic processing method comprises the following steps:*

*a. determining an angular speed (speed I) of the rotatably arranged counter tool and transmitting the determined angular speed to a gap regulator and/or an amplitude regulator,*

*b. detecting (step II) at least one data set of the plurality of generator data over a plurality of revolutions of the counter tool,*

*c. evaluating timely periodically occurring patterns in at least one data set of the plurality of generator data plotted against the time based on a system time of the controlling/regulating module so that the angular speed of the counter tool is determinable without external sensor, and*

*d. comparing a power actual value $P_{ist}$ with a power reference value $P_{soll}$ of the ultrasonic generator in the gap regulator and specifying a position reference value $POS_{soll}$ of the sonotrode with respect to the counter tool and/or*

*e. comparing a power actual value $P_{ist}$ with a power reference value $P_{soll}$ of the ultrasonic generator in the amplitude regulator and specifying an amplitude reference value in the ultrasonic generator for adjusting the power reference value $P_{soll}$ of the ultrasonic generator.*

*20. Ultrasonic processing method of an ultrasonic processing device, comprising:*

*an ultrasonic generator, a converter and at least one sonotrode with an oppositely arranged counter tool, which are spaced from each other by a gap, wherein the sonotrode or the counter tool is arranged rotatably and comprises an even or an uneven circumferential surface, a controlling/regulating module arranged in the ultrasonic generator and integrated in a signal processing of the ultrasonic generator so that with respect to the ultrasonic generator a plurality of generator data is processible in the ultrasonic generator, wherein the ultrasonic processing method comprises the following steps:*

*a. determining an angular speed (step I) of the rotatably arranged counter tool or the rotatably arranged sonotrode and transmitting the determined angular speed to a gap regulator and/or an amplitude regulator,*

*b. detecting (step II) at least one data set of the plurality of generator data,*

*c. comparing a power actual value Pist with a power reference value Psoll of the ultrasonic generator in the gap regulator and specifying a position reference value POSsoll of the sonotrode with respect to the counter tool, and/or*

*d. comparing a power actual value Pist with a power reference value Psoll of the ultrasonic generator in the amplitude regulator and specifying an amplitude reference value $A_{soll}$ in the ultrasonic generator for adjusting the power reference value Psoll of the ultrasonic generator,*

*wherein the ultrasonic processing method comprises the further steps:*

*e. adjusting a fixed gap between the sonotrode and the counter tool, wherein no position sensor with actuator is required, and*

*f. regulating the power reference value Psoll of the ultrasonic generator by adjusting the amplitude reference value $A_{soll}$ of the sonotrode.*

*21. Ultrasonic processing method of an ultrasonic processing device, comprising:*

*an ultrasonic generator, a converter and at least one sonotrode with an oppositely arranged counter tool, which are spaced from each other by a gap, wherein the sonotrode or the counter tool is arranged rotatably and comprises an even or an uneven circumferential surface, a controlling/regulating module arranged in the ultrasonic generator and integrated in a signal processing of the ultrasonic generator so that with respect to the ultrasonic generator a plurality of generator data is processible in the ultrasonic generator, wherein the ultrasonic processing method comprises the following steps:*

*a. determining an angular speed (step I) of the rotatably arranged counter tool or the rotatably arranged sonotrode and transmitting the determined angular speed to a gap regulator and/or an amplitude regulator,*

*b. detecting (step II) at least one data set of the plurality of generator data,*

*c. comparing a power actual value Pist with a power reference value Psoll of the ultrasonic generator in the gap regulator and specifying a position reference value POSsoll of the sonotrode with respect to the counter tool, and/or*

*d. comparing a power actual value Pist with a power reference value Psoll of the ultrasonic generator in the amplitude regulator and specifying an amplitude reference value $A_{soll}$ in the ultrasonic generator for adjusting the power reference value Psoll of the ultrasonic generator,*

*wherein the ultrasonic processing method comprises the further step:*

*e. adjusting the power reference value Psoll of the ultrasonic generator by means of the gap regulator and the amplitude regulator in combination, wherein the power reference value Psoll of the ultrasonic generator is regulatable by means of an active gap adjustment in combination with an amplitude adjustment of the sonotrode.*

* * * * *